United States Patent
Ohmoto

(10) Patent No.: US 8,727,524 B2
(45) Date of Patent: May 20, 2014

(54) IMAGE FORMING METHOD

(71) Applicant: Fujifilm Corporation, Tokyo (JP)

(72) Inventor: Makoto Ohmoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/625,885

(22) Filed: Sep. 25, 2012

(65) Prior Publication Data

US 2013/0083117 A1     Apr. 4, 2013

(30) Foreign Application Priority Data

Sep. 29, 2011   (JP) .................................. 2011-215546
Sep. 12, 2012   (JP) .................................. 2012-200968

(51) Int. Cl.
*G01D 11/00* (2006.01)

(52) U.S. Cl.
USPC .......................................... 347/100

(58) Field of Classification Search
USPC ........ 347/20, 65, 84–87, 95, 96, 100; 522/42, 522/84, 85; 523/160, 161; 106/31.6, 31.13, 106/31.27, 31.78
See application file for complete search history.

(56) References Cited

U.S. PATENT DOCUMENTS

2013/0053485 A1   2/2013   Misawa et al.

FOREIGN PATENT DOCUMENTS

| JP | 2004-090596 A | 3/2004 | |
| JP | 2004323723 | * 11/2004 | ................ B41J 2/41 |
| JP | 2005-111666 | 4/2005 | |
| JP | 2006-249203 A | 9/2006 | |
| JP | 2009-249446 A | 10/2009 | |
| JP | 2009-291976 | 12/2009 | |
| JP | 2010-042600 | 2/2010 | |
| JP | 2010-090266 A | 4/2010 | |
| JP | 2010-105187 A | 5/2010 | |
| JP | 2011-513049 A | 4/2011 | |
| JP | 2012111845 | * 6/2012 | ............. C09D 11/00 |
| JP | 2012236296 | * 12/2012 | ............... B41M 5/00 |
| WO | 2011-093486 | 8/2011 | |

OTHER PUBLICATIONS

English language translation of the following: Office action dated Aug. 20, 2013 from the JPO in a Japanese patent application corresponidng to the instant patent application. This office action translation is submitted now in order to supplement the understanding of patent document JP2009-291976, JP2010-042600, WO2011-093486 and JP2005-111666.

* cited by examiner

*Primary Examiner* — Kristal Feggins
(74) *Attorney, Agent, or Firm* — SOLARIS Intellectual Property Group, PLLC

(57) ABSTRACT

The present invention provides an image forming method including an ink applying process that applies a water-based ink containing at least polymer particles, wax particles having a ratio of from 0.5% by mass to less than 8% by mass with respect to the total amount of the ink, colorant, and water, by an inkjet method (inkjetting), onto a recording base material which is an assembly of a non-absorptive or low-absorptive fiber material.

18 Claims, 1 Drawing Sheet

IMAGE FORMING METHOD

CROSS-REFERENCE TO RELATED APPLICATION

This application claims priority under 35 USC 119 from Japanese Patent Application Nos. 2011-215546, filed on Sep. 29, 2011 and 2012-200968, filed on Sep. 12, 2012, the disclosures of which are incorporated by reference herein.

BACKGROUND OF THE INVENTION

1. Technical Field

The present invention relates to an image forming method using an inkjet method.

2. Background Art

As an image recording method by an inkjet method, a method is known in which recording is performed by ejecting an ink in a droplet from a large number of nozzle provided on an inkjet head. This method enables a high speed image formation, and widely used because, for example, a high quality image can be recorded on a wide variety of recording media.

For a colorant which is one of ingredients of ink material, a pigment is widely used, and the pigment is used by being dispersed in a medium such as water. In the case where the pigment is used in the form of dispersion, dispersed particle size when the pigment is dispersed, stability and size uniformity after dispersion, ejection performance from ejection head, image density and the like are important. A variety of studies on techniques for improving these properties are conducted.

On the other hand, in the case where an image is recorded by an inkjet method, the durability of the recorded image is one of important properties from the viewpoint quality. Among properties which represent the durability of an image, improvement of rub fastness is tried. For example, an ink for inkjet recording that contains water-based resin emulsion in the ink for the purpose of fixing a film of the ink is disclosed (see, for example, Japanese Patent Application Laid-Open (JP-A) No. 2006-249203).

Further, for improvement purpose of seeming rub fastness by enhancing slipping property of an image, use of wax particles is known. For example, a printing method is attempted in which resin ink containing resin particles and wax particles are used in combination with a color ink to perform an inkjet recording on a non-ink-absorptive or low-ink-absorptive recording medium (see, for example, JP-A No. 2010-105187). It is said that this method is excellent in image quality and rub fastness, irrespective of ink-absorptive properties of the recording media.

On the other hand, it is well-known that a base material is subjected to a pretreatment for the purpose of improving ink adhesion. For example, an example in which a nonwoven fabric fiber web is subjected to a surface treatment such as corona treatment is known (see, for example, Japanese Application National Phase Publication No. 2011-513049).

In addition, it is disclosed that when an image is formed on a non-ink-absorptive or low-absorptive recording medium by using an aqueous ink composition, an aqueous ink composition containing wax particles and polymer particles is used (see, for example, JP-A No. 2010-90266).

Further, an inkjet recording method by which bleeding along a fiber is suppressed to a large extent in the case of printing on a cloth (see, for example, JP-A No. 2009-259446). Further, it is disclosed that after subjecting a non-ink-absorptive image-recording surface to a hydrophilication treatment, an image is formed by using an inkjet recording apparatus (see, for example, JP-A No. 2004-90596).

In the case where an ink image is formed on a recording medium such as a nonwoven fabric made of a non-absorptive or low-absorptive synthetic fiber such as polypropylene, since the fiber itself does not absorb an ink, the ink is hard to be fixed. For this reason, the image has poor rubfastness and also the image is inferior in texture such as a hand feeling of the image, which easily poses a problem for quality of the image.

Among the above-mentioned conventional techniques, in the ink for inkjet recording that employs a water-based resin emulsion, an image is formed by using polymer particles. In the case where an image is recorded on a base material made of the above-mentioned non-absorptive or low-absorptive fiber (nonwoven fabric or the like), the image is not yet satisfactory in terms of rubfastness. Accordingly, further improvement is required.

The above-mentioned recording media is generally known to have a poor ink adhesion, and sufficient rub fastness of the image cannot be necessarily obtained only by simply containing resin particles and wax particles in the ink as in the above-mentioned printing method in which printing is performed on non-absorptive or low-absorptive recording media.

To subject a base material to a surface treatment such as a corona treatment as in the above-mentioned Japanese Application National Phase Publication No. 2011-513049 is effective for improvement of ink adhesion. However, adhesion enough to maintain rub fastness cannot be obtained only by the surface treatment, and for example, drying and fixing treatment of the ink are required. When the base material is non-absorptive or low-absorptive, sufficient drying of the ink is hard to be performed, and the amount of ejected droplet is not always properly controlled, which poses a problem for bleeding of image.

Further, regarding a recording medium in the above-mentioned JP-A No. 2010-90266, art paper, coat paper and the like as well as a plastic film are exemplified as an ink-low absorptive recording medium. However, a quality of an image formed on a medium composed of a non-absorptive or low-absorptive fiber is not taken into consideration.

Further, in the above-mentioned JP-A No. 2009-259446, incorporation of a predetermined amount of wax together with an aqueous dispersion type polymer such as a urethane polymer as ink components is not proposed.

The present invention was made in view of the above-mentioned circumstances. An object of the present invention is to provide an image forming method in which an image having a good texture such as hand feeling (for example, without hardness and stickiness of an image) and an excellent rub fastness is formed by employing a nonwoven fabric made of a non-ink-absorptive or low-absorptive fiber, and the present invention aims to attain the object.

SUMMARY OF THE INVENTION

As a result of investigation, the present inventors obtained the following knowledge. In the case where an image is recorded on a nonwoven fabric made of a non-ink-absorptive or low-absorptive fiber such as polypropylene or the like, it is important in terms of image quality such as rub fastness or hand feeling that when an ink is employed, the ink contains polymer particles and a predetermined ratio of wax particles, since the above-mentioned base material is composed of an assembly of fibers having a poor ink absorptive property, which is different from a plain paper or an inkjet paper used for normal image recording. The present invention has been completed on a basis of such a finding.

For the purpose of addressing the above-mentioned problems, a first aspect of the present invention provides an image forming method including an ink applying process that applies a water-based ink containing at least polymer particles, wax particles having a ratio of from 0.5% by mass to less than 8% by mass with respect to the total amount of the ink, a colorant, and water, by an inkjet method (inkjetting), onto a recording base material which is an aggregate of a non-absorptive or low-absorptive fiber material.

DETAILED DESCRIPTION OF THE INVENTION

Figure 1A:
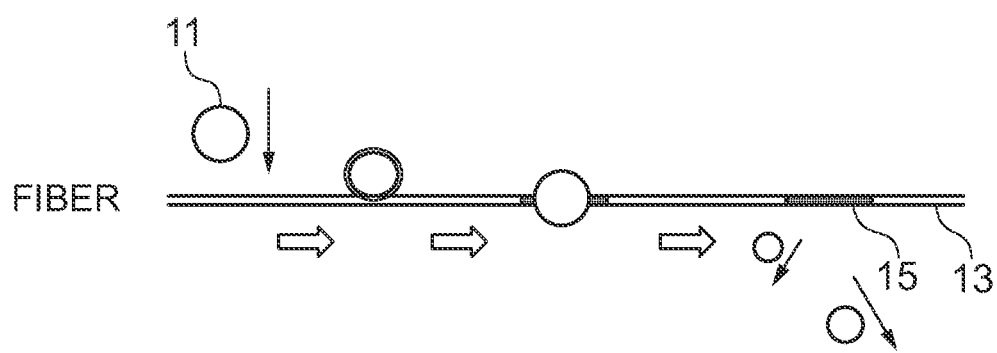
FIG. 1A is a schematic diagram conceptually illustrating a spread of an ink and adherence of the ink to a fiber at the time when the ink has been spotted to a nonwoven fabric.

The image forming method of the present invention will be described below in detail.

The image forming method of the present invention is configured to include an ink applying process that applies a water-based ink containing at least polymer particles, wax fine particles with a ratio of from 0.5% by mass to less than 8% by mass with respect to the total amount of the ink, a colorant and water, by an inkjet method, onto a recording base material which is an aggregate of a non-absorptive or low-absorptive fiber material.

In the present invention in which image recording is performed on a recording medium that is not a recording paper composed mainly of pulp which is generally used for inkjet recording such as a plain paper, an inkjet paper or a coated paper, but a nonwoven fabric made of a non-ink-absorptive or low-ink-absorptive fiber such as polypropylene, rub fastness of the image that is considerably weaker than the case where the plain paper or the like is used can be effectively improved by incorporating polymer particles and a predetermined amount of wax particles into an ink to be applied. This also enables the image to have high quality in terms of excellent texture such as hand feeling (for example, without hardness or stickiness of the image or the like).

Ink Applying Process

In the ink applying process in the present invention, by an inkjet method, a water-based ink is applied onto a recording base material which is an assembly of a non-absorptive or low-absorptive fiber material. The detail of the water-based ink in the present invention is described below.

Application of the water-based ink onto a recording base material is performed by an inkjet method. By utilizing the inkjet method, ink is selectively applied onto a desired area.

The inkjet method is not particularly limited, and any of known methods can be used such as electric charge control method in which an ink is ejected by using electrostatic attraction, a drop-on-demand method (pressure pulse) in which oscillating pressure of piezo elements is used, an acoustic inkjet method in which an electric signal is converted into an acoustic beam, and then a radiation pressure is produced by irradiating the acoustic beam onto an ink, and then the ink is ejected by using the radiation pressure, and a thermal inkjet (Bubble Jet (registered trademark)) method in which an ink is heated to form a bubble and the formed pressure is used.

In the case where an ink is applied onto a recording base material, as an application method, either a multipath or a single path may be used and a single path or a dual path is preferred from the viewpoint of high speed recording. Herein, the single path means a recording method in which all dots to be formed on the scanning area is recorded in one scanning for a fast scanning direction. In the single path, a ejection head (line head on which recording elements are arrayed) having a length corresponding to the width length in the base material width direction intersecting a slow scanning direction during recording is provided, and an ink is ejected simultaneously in a fast scanning direction from plural ejection holes provided on the ejection head. This is so-called a line-type, and by scanning a recording medium in a direction intersecting the array direction of the recording element (slow scanning direction), an image can be recorded on the whole surface of the recording base material. A conveying system such as carriage in a shuttle method in which a recording is performed by scanning a short serial head in a width direction (fast scanning direction) of a recording base material, is not required. The dual path is a method in which a dot to be ejected on a scanning area is recorded two times by scanning.

Figure 1B:
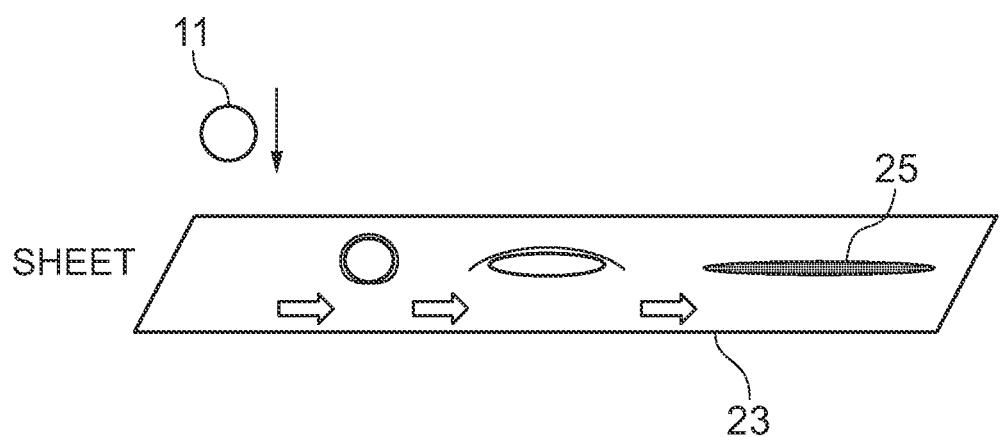
FIG. 1B is a schematic diagram conceptually illustrating a spread of an ink at the time when the ink has been spotted to a recording paper.

In the present invention, from the viewpoint of preserving good global environment and work environment at the time of image recording, a water-based ink is employed. When a water-based ink is applied on a recording base material which is an assembly of a non-absorptive or low-absorptive fiber material, the ink is absorbed in a recording base material (for example, nonwoven fabric). However, since the fiber itself that forms the recording base material has a poor ink-absorption property, as shown in FIG. 1A, although a part of the applied ink droplet 11 is adhered to a fiber (nonwoven fabric) 13 and left on the fiber to form a colored portion, the other part of the ink droplet which cannot be adhered and cannot be retained separates from the part of the ink droplet to soak in the depth of the material. On the other hand, since, for a recording paper (sheet) 23 such as a plain paper or the like that is widely used generally for image recording, the material itself such as pulp which constitutes the sheet absorbs an ink, as shown in FIG. 1B, after the applied ink is spotted onto a surface of the sheet, the ink spreads not only in the thickness direction of the sheet, but also in the surface direction, and enters into spaces in the paper whereby the ink is fixed. Each numerical number 15 in Fig. A and 25 in FIG. 1B indicates an ink adhesion region. In view of the difference from one another, the water-based ink used for forming an ink image is configured to have a composition including polymer particles and from 0.5% by mass to less than 8% by mass of wax particles. That is, as in FIG. 1A, although the whole ink droplet is hard to be retained on the surface of the fiber, a composition by which texture in terms of absence of hardness and stickiness of the image or the like is retained and at the same time adhesion of the ink to a fiber is enhanced and rub fastness of the image is retained is selected.

The amount of ink droplet applied onto a recording base material is not particularly limited as long as the amount is in a range which satisfies desired rub fastness and texture of the image portion. In the present invention, the amount of the ink droplet is preferably in a range of from 60 pl to 120 pl, more preferably from 70 pl to 110 pl, and still more preferably from 70 pl to 100 pl.

When the amount of ink droplet is not smaller than 60 pl, an ink area is held stably after fixation on the fiber and the ink is hard to be peeled off, thereby enhancing rub fastness of the image. When the amount of ink droplet is not larger than 120 pl, drying of droplet on the surface of the base material is favorably performed, thereby preventing from occurrence of image bleeding.

The diameter of the ink droplet which is applied onto a recording base material (diameter before impact of the ink droplet) is preferably from 48 μm to 61 μm and more preferably from 51 μm to 59 μm. The diameter of the ink droplet can be directly measured by droplet observation by high-speed camera (for example, Hyper Vision HPV-2A manufactured by Shimadzu Corporation).

From the viewpoint of stably supplying an ink to a recording head from an ink tank, the viscosity of water-based ink (30° C.) is preferably from 4 to 20 mPa·s, and more preferably from 6 mPa·s to 16 mPa·s.

For example, the resolution for each color is preferably not less than 100 dpi (dot per inch), and the ink viscosity is preferably from 4 to 20 mPa·s (30° C.). The resolution is desirably not less than 200 dpi from the viewpoint of high image quality.

Water-Based Ink

The water-based ink in the present invention is composed such that its composition contains at least polymer particles, wax particles with a ratio of from 0.5% by mass to less than 8% by mass with respect to a total amount of the ink, a colorant and water. The water-based ink in the present invention may be further composed of components such as a dispersant for the pigment, a water soluble organic solvent, a surfactant or other additives, as needed.

Colorant

The water-based ink in the present invention preferably contains at least one colorant. As the colorant, a pigment, a dye or the like is favorably used. In particular, from the viewpoint of light resistance of the image, a pigment is preferred. The pigment is not particularly limited, and appropriately selected depending on the purpose. For example, any of organic pigments and inorganic pigments may be used. The pigment is preferably almost insoluble or hardly soluble in water from the viewpoint of ink coloring Examples of the organic pigment include: polycyclic pigments such as azo lake, azo pigment, phthalocyanine pigment, perylene and perinone pigment, anthraquinone pigment, quinacridone pigment, dioxazine pigment, diketopyrrolopyrrole pigment, thioindigo pigment, isoindolinone pigment and quinophthalone pigment; dye lakes such as basic dye lake and acidic dye lake; nitro pigment, nitroso pigment, aniline black and daylight fluorescent pigment. Examples of inorganic pigments include titanium oxides, iron oxides and carbon black. Any pigments which are not listed on a color index can be used as long as the pigments are dispersible in aqueous phase.

A surface-treated pigment in which the above-described pigment is surface-treated with a surfactant, a polymer dispersant or the like, or a graft carbon or the like may be used.

Among the above-mentioned pigments, an azo pigment, a phthalocyanine pigment, an anthraquinone pigment, a quinacridone pigment and a carbon black pigment are preferred.

Hereinafter, a water dispersible pigment and pigment dispersion that are preferably used in the present invention are described.

Examples of the water dispersible pigment include the following classes (1) to (4):
(1) An encapsulated pigment, that is, a polymer dispersion formed by incorporating a pigment into polymer particles; more specifically, a pigment particles that has been made water-dispersible by covering the pigment with a resin layer formed of a hydrophilic water-insoluble resin, thereby imparting hydrophilicity to the resin layer on a surfaces of the pigment;
(2) A self-dispersing pigment, that is, a pigment having at least one type of hydrophilic group on a surface thereof and exhibiting at least one of water-dispersibility or water-solubility in the absence of a dispersant; more specifically, the pigment that is prepared by subjecting the surfaces of carbon black and like to an oxidizing treatment so as to impart hydrophilicity to the pigment and so as to enable the pigment itself to disperse in water;
(3) A resin dispersed pigment, that is, a pigment dispersed using a water-soluble polymer compound having a weight average molecular weight of 50,000 or less; and
(4) A surfactant-dispersed pigment, that is, a pigment dispersed using a surfactant.

First, the encapsulated pigment will be described in detail.

The resin used in the encapsulated pigment is not specifically limited, but is preferably a polymer compound that is self-dispersible or dissolvable in a mixed solvent of water and a water-soluble organic solvent and that has an anionic (acidic) group. In general, the number average molecular weight of the resin is preferably in the range of about 1000 to about 100,000, and particularly preferably in the range of about 3000 to about 50,000. The resin is preferably a resin that can dissolve in an organic solvent to form a solution. When the number average molecular weight of a resin is within the above ranges, the resin can exhibit sufficient function as a cover film on pigment or as a coated film in the case where the resin is used in an ink. The resin is preferably used in the form of an alkali metal salt or an organic amine salt.

The resin used for the encapsulated pigment may be, for example, a material having an anionic group, and examples thereof include thermoplastic, thermosetting, or modified resins of the following types of resin: an acrylic resin, an epoxy resin, a polyurethane resin, a polyether resin, a polyamide resin, an unsaturated polyester resin, a phenol resin, a silicone resin, a fluorine resin; a polyvinyl resin such as polyvinyl chloride, polyvinyl acetate, polyvinyl alcohol or polyvinyl butyral; a polyester resin such as an alkyd resin or a phthalic acid resin; an amino resin such as a melamine resin, a melamine-formaldehyde resin, an aminoalkid co-condensed resin, or a urea resin; and copolymers or mixtures of these resins.

Of the above resins, an anionic acrylic resin can be obtained, for example, by polymerizing, in a solvent, an acrylic monomer having an anionic group (hereinafter, referred to as an anionic group-containing acrylic monomer) and, optionally, one or more other monomers copolymerizable with the anionic group-containing acrylic monomer. Examples of the anionic group-containing acrylic monomer include an acrylic monomer having one or more anionic groups selected from the group consisting of a carboxylic group, a sulfonic acid group and a phosphonic group. Among these monomers, an acrylic monomer having a carboxyl group is preferable. Examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are preferable.

An encapsulated pigment can be manufactured by a conventional physical and/or chemical method by using the above components. For example, the encapsulated pigment can be manufactured by the methods described in JP-A Nos. 9-151342, 10-140065, 11-209672, 11-172180, 10-25440, or 11-43636. Specifically, examples of the method include a phase-transfer emulsification method and acid deposition, described in JP-A Nos. 9-151342 and 10-140065. Of these methods, the phase transfer emulsification is preferable from the viewpoint of dispersion stability. The phase transfer emulsification is described below.

Further, a self-dispersing pigment is an example of a preferable pigment. The self-dispersing pigment is a pigment in which a number of hydrophilic functional groups and/or a salt thereof (hereinafter, referred to as a dispersibility-imparting group) are bonded directly, or indirectly via an alkyl group, an alkyl ether group, an aryl group or the like, to the surfaces of the pigment, so that the pigment can be dispersed in an aqueous medium without a dispersant. Here, the term "dispersed in an aqueous medium without a dispersant", indicates a state in which the pigment is dispersible in the aqueous medium even when a dispersant for dispersing the pigment is not used.

An ink containing a self-dispersing pigment as a colorant does not need to contain a dispersant, which is otherwise usually contained for dispersing a pigment. Therefore, the ink containing a self-dispersing pigment is free from decrease in defoaming properties due to a dispersant, and generation of foam is hardly observed in the ink containing a self-dispersing pigment; accordingly an ink with excellent ink ejection stability can be easily prepared. Examples of dispersibility-imparting groups to be bonded to the surfaces of self-dispersing pigment include —COOH, —CO, —OH, —$SO_3H$, —$PO_3H_2$, and a quaternary ammonium, and salts thereof. The self-dispersing pigment can be bonded to a surfaces of a pigment by subjecting the pigment to a physical or chemical treatment and by bonding (grafting) a dispersibility-imparting group or an active species having a dispersibility-imparting group to the surfaces of the pigment. Examples of the physical treatment include a vacuum plasma treatment. Examples of the chemical treatment include a wet oxidizing method in which a surface of a pigment is oxidized by an oxidizing agent in water and a method in which p-aminobenzoic acid is bonded to a surface of a pigment whereby a carboxyl group is linked to the pigment through a phenyl group.

In the present invention, preferable examples of the self-dispersing pigment include a self-dispersing pigment whose surface has been subjected to an oxidation treatment with a hypohalous acid and/or hypohalite and a self-dispersing pigment whose surface has been subjected to an oxidation treatment with ozone. Commercially available products may also be used as the self-dispersing pigment. Examples thereof include, MICROJET CW-1 (trade name, manufactured by Orient Chemical Industry), and CAB-O-JET200 and CAB-O-JET300 (trade names, manufactured by Cabot Corporation).

As the pigment, preferred is an encapsulated pigment in which at least a portion of a surface of a pigment is covered with a water-insoluble resin that is used selecting from among pigment dispersants, for example, a polymer emulsion in which a pigment is incorporated in water-insoluble resin particles, more minutely, a water-dispersing pigment in which at least a portion of a surface of a pigment is covered with a water-insoluble resin to form a resin layer on the surface of the pigment so that the pigment is able to disperse in water. To use such an encapsulated pigment covered with the water-insoluble resin is preferable from the viewpoint of aggregation of the pigment, and further preferable from the viewpoint that a high-resolution image can be formed in a high speed recording.

Herein, a phase-transfer emulsification method is described.

The phase-transfer emulsification method is basically a self-dispersion (phase-transfer emulsification) method of dispersing a mixed melt of a resin having a self-dispersing ability or a dissolving ability and a pigment in water. Further, the mixed melt may contain a curing agent, or both a polymer compound and a curing agent. Herein, the mixed melt means to incorporate any of the mixed state without dissolution, the mixed state with dissolution, and a combination of the above-described states. More specific examples of the production method in accordance with the phase-transfer emulsification method include methods described in JP-A No. 10-140065.

More specific methods in accordance with the phase-transfer emulsification method and acid deposition may be referred to JP-A Nos. 9-151342 and 10-140065.

Further, in the present invention, the pigment is more preferably a resin-coated pigment in which at least a portion of a surface of the pigment is covered with a cross-linked polymer in which a water-soluble resin has been cross-linked with a cross-linking agent. The water-soluble resin acts as a dispersing agent for dispersing a pigment. On account that the pigment is covered with a cross-linked polymer, an excellent stability (stability to pH variation and stability to temperature variation) can be exerted to the pigment dispersion, or an ink composition in a case where the pigment dispersion is used to constitute the ink composition.

Examples of the water-soluble resin include polyvinyl resins, polyurethane resins and polyester resins. Among these, polyvinyl resins are preferable.

The water-soluble resin described herein has, in the molecule thereof, a group that brings about a cross-linking reaction due to a cross-linking agent. Such group is not particularly limited. Examples of the group include a carboxyl group or a salt thereof, an isocyanate group and an epoxy group. In the present invention, it is preferable that the water-soluble resin has a carboxyl group or a salt thereof from the viewpoint of improvement in dispersibility.

The water-soluble resin is preferably a copolymer that is obtained by using a carboxyl group-containing monomer as a copolymerization component. Examples of the carboxyl group-containing monomer include methacrylic acid, β-carboxyethylacrylate, fumaric acid, itaconic acid, maleic acid and crotonic acid. Among these, methacrylic acid and β-carboxyethylacrylate are preferable from the viewpoint of cross-linking performance and dispersion stability.

Further, beside the carboxyl group-containing monomer, optionally selected hydrophilic monomers or hydrophobic monomers may be used as a copolymerization component. The hydrophilic monomer may be ionic or nonionic. Although the hydrophobic monomer is not particularly limited, alkyl methacrylate having 1 to 20 carbon atoms and alkyl acrylate having 1 to 20 carbon atoms are preferable.

The water-soluble resin may be any of random polymers, block polymers and graft polymers.

The acid value (mg number of KOH necessary to neutralize 1 g of water-soluble resin) of the water-soluble resin is preferably from 135 to 250 mg KOH/g, more preferably from 135 to 200 mg KOH/g, and especially preferably from 135 to 180 mg KOH/g, from the viewpoint of both dispersibility and dispersion stability of the pigment.

Although a synthetic method of a polymer as the water-soluble resin is not particularly limited, a random polymerization method of vinyl monomers is preferable from the viewpoint of dispersion stability.

As for the cross-linking agent, compounds having 2 or more sites that bring about a cross-linking reaction may be used. Among these, di-functional or more multifunctional epoxy compounds are preferable from the viewpoint of excellence in reaction with a carboxyl group. Specific examples of the di-functional or more multifunctional epoxy compounds include ethyleneglycol diglycidyl ether, polyethyleneglycol diglycidyl ether, 1,6-hexanediol diglycidyl ether, diethyleneglycol diglycidyl ether, dipropyleneglycol diglycidyl ether and polypropyleneglycol diglycidyl ether. Among these, polyethyleneglycol diglycidyl ether and diethyleneglycol diglycidyl ether are preferable.

The molar ratio of the cross-linking site of the cross-linking agent and the site of the water-soluble resin to be cross-linked is preferably from 1:1.1 to 1:10, more preferably from 1:1.1 to 1:5, and most preferably from 1:1.1 to 1:3 from the viewpoint of a rate of cross-linking reaction and stability of dispersion after curing.

The amount of the water-soluble resin with respect to the pigment is preferably from 10 to 250% by mass, more preferably from 10 to 200% by mass, still more preferably from 20 to 150% by mass, and especially more preferably from 30 to 100% by mass.

The resin-coated pigment in which at least a portion of a surface of the pigment is covered with a cross-linked polymer in which a water-soluble resin has been cross-linked with a cross-linking agent can be obtained through a process of dispersing a pigment with a water-soluble resin, followed by cross-linking with a cross-linking agent.

As an example of preferable preparation methods, a method that is performed through the following processes (1) to (3) is described below.

(1) A dispersion process of dispersing a pigment and the above-described water-soluble resin in water or an aqueous solution of a polar solvent to obtain pigment dispersion liquid.

(2) A cross-linking process of bringing about a cross-linking reaction by adding a cross-linking agent to the pigment dispersion liquid obtain by the above-described process (1) and heating, thereby covering the surface of the pigment with the cross-linked polymer.

(3) A process of purifying the resin-coated pigment covered with the cross-linked polymer.

In addition to these processes, if needed, other processes may be appropriately incorporated. In the process (1), known polar solvent and the like may be used appropriately.

As the resin-coated pigment covered with the cross-linked polymer, specifically the following commercial products are favorably used: Projet Yellow APD 1000, Projet Magenta APD 1000, Projet Cyan APD 1000, and Projet Black APD 1000 (all trade name, manufactured by FUJIFILM Imaging Colorants Ltd.) and the like.

Dispersant

The water-based ink in the present invention can contain at least one type of dispersant. The dispersant for the pigment may be any of a polymer dispersant or a low molecular surfactant-type dispersant. Further, the polymer dispersant may be either a water-soluble dispersant or a water-insoluble dispersant.

The term "water-insoluble" herein means that when a dispersant is dried at a temperature of 105° C. for two hours and then, the resultant is dissolved in 100 g of water at a temperature of 5° C., the amount of dissolution is not larger than 10 g.

By the low molecular surfactant-type dispersant, an ink can be maintained at a low viscosity and at the same time, the pigment can be stably dispersed in a water solvent. A low molecular surfactant-type dispersant is low molecular weight dispersant having a molecular weight of not larger than 2,000. The molecular weight of the low molecular surfactant-type dispersant is preferably from 100 to 2,000 and more preferably from 200 to 2,000.

The low molecular surfactant-type dispersant has a structure containing a hydrophilic group and a hydrophobic group. Each hydrophilic group and hydrophobic group is independently contained in a proportion of one or more groups per one molecule of the dispersant, and plural hydrophilic groups and hydrophobic groups may be contained. The dispersant may have a linking group that links the hydrophilic group and the hydrophobic group, as appropriate.

Examples of the hydrophilic group include an anionic group, a cationic group, a nonionic group and a betaine-type group in which these groups are combined. The anionic group may be any group as long as the group is negatively charged, and it is preferably a phosphate group, a phosphonate group, a phosphinate acid group, a sulfate group, a sulfonate group, a sulfinate group or a carboxylate group, more preferably, a phosphate group and a carboxylate group, and still more preferably a carboxylate group. The cationic group may be any group as long as the group is positively charged, and it is preferably an organic cationic substituent, more preferably a cationic group of nitrogen or phosphorus, and still more preferably a pyridinium cation or an ammonium cation. Examples of the nonionic group include polyethylene oxide, polyglycerin and a part of sugar unit.

The hydrophilic group is preferably an anionic group.

The hydrophobic group has a structure such as hydrocarbon-based structure, fluorocarbon-based structure, or silicone-based structure, and a hydrocarbon-based structure is particularly preferred. The hydrophobic group may have a linear structure or a branched structure. The hydrophobic group has a single-chain structure or a double-chain or multiple-chain structure, and when the hydrophobic group has a double-chain or multiple-chain structure, plural kinds of hydrophobic groups may be contained.

The hydrophobic group is preferably a hydrocarbon group having 2 to 24 carbon atoms, and more preferably a hydrocarbon group having 4 to 24 carbon atoms, and still more preferably a hydrocarbon group having 6 to 20 carbon atoms.

Among these polymer dispersants, examples of water-soluble dispersants include hydrophilic macromolecular compounds. Examples of natural hydrophilic macromolecular compounds include: vegetable polymers such as gum arabic, gum tragacanth, guar gum, karaya gum, locust bean gum, arabinogalactan, pectin and quince seed starch; seaweed polymers such as alginic acid carageenan and agar; animal polymers such as gelatin, casein, albumin and collagen; and microbial polymers such as xanthane gum and dextran.

Examples of hydrophilic macromolecular compounds which are modified with natural products as raw materials include: cellulose polymers such as methyl cellulose, ethyl cellulose, hydroxyl ethyl cellulose, hydroxyl propyl cellulose and carboxymethyl cellulose; starch polymers such as sodium starch glycolate and sodium starch phosphate; and seaweed polymers such as sodium alginate and propylene glycol alginate ester.

Further, examples of synthetic hydrophilic macromolecular compounds include: vinyl polymers such as polyvinyl alcohol, polyvinylpyrrolidone and polyvinyl methyl ether; acrylic resins such as non-crosslinked polyacrylamide, polyacrylic acid or alkali metal salts thereof, a water-soluble styrene acrylic resin and a water-soluble vinyl naphthalene acrylic resin; a water-soluble styrene maleic acid resin; a water-soluble vinyl naphthalene maleic acid resin; alkali metal salts of β-naphthalene sulfonic acid formaldehyde condensates; macromolecular compounds having salts of a cationic functional group such as quaternary ammonium and an amino group as a side chain; and natural macromolecular compounds such as shellac.

Among these, from the viewpoint of the dispersion stability of pigment, macromolecular compounds containing a carboxyl group are preferred, and macromolecular compounds containing a carboxyl group exemplified by acrylic resins such as a water-soluble styrene acrylic resin and a water-soluble vinyl naphthalene acrylic resins; a water-soluble styrene maleic acid resin and a water-soluble vinyl naphthalene maleic acid resin are particularly preferred.

Among the polymer dispersants, as the water insoluble dispersant, a polymer having both a hydrophobic portion and a hydrophilic portion can be employed. Examples of the water insoluble polymer dispersants include styrene-(meth)acrylic acid copolymer, styrene-(meth)acrylic acid-(meth)acrylic acid ester copolymer, (meth)acrylic acid ester-(meth)acrylic acid copolymer, polyethylene glycol(meth)acrylate-(meth)acrylic acid copolymer, vinyl acetate-maleic acid copolymer and styrene-maleic acid copolymer.

The weight-average molecular weight of the polymer dispersant is preferably from 3,000 to 200,000, more preferably from 5,000 to 100,000, still more preferably from 5,000 to 80,000 and particularly preferably 10,000 to 60,000.

From the viewpoint of self-dispersibility, the polymer dispersant preferably includes a polymer having a carboxyl group, and the polymer is preferably a polymer having a carboxyl group and having an acid value of not larger than 100 mg KOH/g, and more preferably a polymer having an acid value of from 25 to 100 mg KOH/g.

The mixing mass ratio of a pigment to a dispersant (pigment:dispersant) is preferably in a range of from 1:0.06 to 1:3, more preferably in a range of from 1:0.125 to 1:2 and still more preferably in a range of from 1:0.125 to 1:1.5.

A dye may be used in place of a pigment. When the dye is used, a dye which is held in a water-insoluble carrier can be used. As the dye, known dyes can be used without limitation, and the dyes described in JP-A No. 2001-115066, JP-A No. 2001-335714, JP-A No. 2002-249677 and the like can be favorably used. The carrier is not particularly limited as long as the carrier is insoluble or hardly soluble in water, and inorganic materials, organic materials and composite materials thereof can be selectively used. Concretely, carriers described in JP-A No. 2001-181549, JP-A No. 2007-169418 or the like are favorably used.

The carrier in which a dye is held (water-insoluble colored particles) can be used as a water-based dispersion with a dispersant. As the dispersant, the above-mentioned dispersant can be favorably used.

In the present invention, from the viewpoint of rub fastness or quality of the image, the ink preferably contains a pigment and a dispersant. More preferably, a pigment and a polymer dispersant are contained in the form of a water-dispersible pigment in which at least a part of a surface of the pigment is coated with the polymer dispersant (specifically, a resin-coated pigment a surface of which is covered with a cross-linked polymer in which a water-soluble resin has been cross-linked with a cross-linking agent). Further, the water-based ink particularly preferably contains an organic pigment and a polymer dispersant containing a carboxyl group such that a combination of the organic pigment and the polymer dispersant containing a carboxyl group forms a water-dispersible pigment in which the organic pigment is coated with the polymer dispersant having a carboxyl group on at least a part of a surface of the pigment.

The average particle size of the pigment in a dispersion state is preferably from 10 to 200 nm, more preferably from 10 to 150 nm and still more preferably from 10 to 100 nm. When the average particle size is not larger than 200 nm, the color reproducibility becomes favorable, and spot characteristics of the ink droplet become favorable when ink droplets are spotted by an inkjet method. When the average particle diameter is not smaller than 10 nm, light resistance becomes favorable. The particle-size distribution of the colorant is not particularly limited, and may be a broad particle-size distribution or a monodispersed particle-size distribution. It is also possible to use a mixture of two or more colorants having monodispersed particle-size distributions.

Here, the average particle size of the pigment in the dispersion state represents an average particle size in a state of the formed ink, and the same is applied to a state before the ink formation, that is, a state of so-called "condensed ink dispersion".

The average particle size of the pigment in the dispersion state and the average particle size of below-mentioned polymer particles and the particle-size distribution are determined by measuring a volume-average particle size in accordance with dynamic light scattering using NANOTRAC particle size distribution analyzer UPA-EX150 (trade name, manufactured by NIKKISO Co., Ltd.).

The pigment may be used solely or in combination of two or more types thereof.

The content of pigment in a water-based ink is, from the viewpoint of the image density, preferably from 1 to 25% by mass, and more preferably from 2 to 15% by mass with respect to the total amount of ink.

Polymer Particles

The water-based ink in the present invention contains at least one type of polymer particles. By containing polymer particles therein, both adhesion of the image to the recording base material and rub fastness of the image are improved.

Examples of the polymer particles include particles of thermoplastic, thermosetting or modified resins such as acrylic resins, epoxy resins, polyurethane resins, polyether resins, polyamide resins, unsaturated polyester resins, phenolic resins, silicone resins, fluorine resins, polyvinyl resins (examples: polyvinyl chloride, polyvinyl acetate, polyvinyl alcohol, polyvinyl butyral or the like), alkyd resins, polyester resins (examples: phthalate resins or the like), styrene-butadiene resins, polyolefin resins, amino materials (examples: melamine resins, melamine formaldehyde resins, and amino alkyd co-condensation resins, and urea resins or the like), or a copolymer or a mixture thereof.

Two or more types of polymer particles may be used, and particles composed of a polymer in which two or more types of polymers are mixed or bind to each other may be used.

Among the above, as the resin for polymer particles, acrylic resins, polyurethane resins, polyether resins, polyester resins, styrene-butadiene resins and polyolefin resins are preferred, and from the below-mentioned viewpoint, polyurethane resins are particularly preferred.

The reason why the polyurethane resins are good is presumed as follows. That is, it is presumed that polyurethane resins are composed of a urethane moiety in which an interaction between polymers is strong like a hydrogen bond and a non-urethane moiety in which interaction between polymers is relatively weak, and that, when a film of the ink is formed, as a micro-structure, a moiety having a relatively strong interaction and a moiety having a relatively weak interaction get together to construct a "sea-island" structure, whereby polyurethane presumably has flexibility. Since polyurethane essentially has flexibility as mentioned above, those having a higher Tg than a conventionally known example which uses a polymer particle having a low Tg can be used. Presumably for this reason, an ink film (ink image) having flexibility and strength, as well as an excellent rub fastness can be formed.

Therefore, the polyurethane resins have advantage in the case of using "a recording base material which is an assembly of a non-absorptive or low-absorptive fiber material" with which rub fastness is hardly achieved in particular.

As the acrylic resins, those having anionic group are preferred. Such acrylic resins are obtained by polymerizing in a solvent, for example, an acrylic monomer having an anionic group (an anionic group-containing acrylic monomer) and, as needed, other monomers which are copolymerizable with the anionic group-containing acrylic monomer. Examples of the anionic group containing acrylic monomer include an acrylic monomer containing at least one group selected from a carboxyl group, a sulfonic acid group and a phosphonic acid group. Among these, acrylic monomers having a carboxyl group (for example, acrylic acid, methacrylic acid, crotonic acid, ethacrylic acid, propyl acrylic acid, isopropyl acrylic acid, itaconic acid and fumaric acid) are preferred, and acrylic acid or methacrylic acid is particularly preferred.

As the polymer particle, self-dispersing polymer particles having self-dispersibility are favorable. The self-dispersing polymer particles are described below.

The self-dispersing polymer particles mean particles of a water-insoluble polymer in which, when the polymer is brought in a dispersion state (particularly formation of the dispersion state by phase inversion emulsification) in the absence of a surfactant, the polymer is capable of forming a dispersion state in an aqueous medium by the action of a functional group (particularly, acidic group or salts thereof) which the polymer itself has, and particles of the water-insoluble polymer which does not contain a free emulsifier.

The self-dispersing polymer particles are preferable from the viewpoint of ejection stability and liquid stability of the system containing the pigment (in particular, dispersion stability). Among these, the self-dispersing polymer particles having a carboxyl group are more preferred.

Here, the term "dispersion state" includes both an emulsified state (emulsion) in which a water-insoluble polymer is dispersed in an aqueous medium in a liquid state, and a dispersion state (suspension) in which a water-insoluble polymer is dispersed in an aqueous medium in the solid state.

In the water-insoluble polymer in the present invention, it is preferable that the water-insoluble polymer is a water-insoluble polymer which can be in a dispersion state in the solid state, from the viewpoint of fixation properties when incorporated in a liquid composition.

Examples of the method for preparing an emulsified or dispersed self-dispersing polymer, that is, an aqueous dispersion of the self-dispersing polymer include a phase inversion emulsification. Examples of the phase inversion emulsification include a method in which a self-dispersing polymer is dissolved or dispersed in a solvent (for example, a hydrophilic organic solvent or the like), and then the solution or dispersion is poured directly into water without adding a surfactant, and then mixed while stirring in the state in which a salt-forming group (for example, an acidic group) carried by the self-dispersing polymer is neutralized, and then the solvent is removed, thereby obtaining an aqueous dispersion of the self-dispersing polymer in an emulsion or dispersion state.

The dispersion state for the self-dispersing polymer particles means that even when a mixture of a solution prepared by dissolving 30 g of a water-insoluble polymer in 70 g of an organic solvent (for example, methyl ethyl ketone), a neutralizer which can neutralize 100% of a salt-forming group of the water-insoluble polymer (when the salt-generating group is anionic, sodium hydroxide may be used, and when the salt-producing group is cationic, acetic acid may be used), and 200 g of water is mixed and stirred (apparatus: a stirring apparatus equipped with a stirring blade, speed of rotation 200 rpm, for 30 minutes, 25° C.), and then the organic solvent is removed from the mixture, it can be confirmed visually that the dispersion state is kept stable at 25° C. for at least one week.

The water-insoluble polymer refers to a polymer exhibiting a dissolved amount of not larger than 10 g when dried at 105° C. for 2 hours and then dissolved in 100 g of water at 25° C., and the dissolved amount is preferably not larger than 5 g, and more preferably not larger than 1 g. The dissolved amount refers to a dissolved amount at the time when a polymer is 100% neutralized by sodium hydroxide or acetic acid, in accordance with the kind of the salt-forming group of the water-insoluble polymer.

The aqueous medium includes water as a component and, as needed, it may contain a hydrophilic organic solvent. In the present invention, the aqueous medium is preferably composed of water and a hydrophilic organic solvent of not larger than 0.2% by mass with respect to the amount of the water, and is more preferably composed of only water.

The main chain skeleton of the water-insoluble polymer is not particularly limited, and may be, for example, vinyl polymer or condensed polymers (such as epoxy resins, polyester, polyurethane, polyamides, cellulose, polyether, polyureas, polyimides and polycarbonate). Among these, vinyl polymer and polyurethane are especially preferable.

Suitable examples of the monomers for forming the condensed polymer are described in JP-A No. 2001-247787. The polyurethane is synthesized by polyaddition reaction by using a diol compound and a diisocyanate compound as source materials. The details of the diol compound and the diisocyanate compound can be referred to by the description in the paragraphs [0031] to [0036] of JP-A No. 2001-247787.

Suitable examples of the vinyl polymer and the monomer or monomers for forming the vinyl polymers include those described in JP-A Nos. 2001-181549 and 2002-88294. A vinyl polymer may be used which has a dissociative group introduced to a terminal of the macromolecular chain; the dissociative group may be introduced by radical polymerization of a vinyl monomer using a chain transfer agent, a polymerization initiator, or an iniferter each of which has the dissociative group (or a substituent that can be derived into the dissociative group), or by ionic polymerization using a compound in which the dissociative group (or a substituent that can be derived into the dissociative group) binds to either of an initiator or a terminator.

The polymer particles preferably contain a water-insoluble polymer containing a hydrophilic constituent unit and a constituent unit derived from an aromatic group-containing monomer, from the viewpoint of self-dispersibility.

The hydrophilic constituent unit is not particularly limited as long as it is derived from a hydrophilic group-containing monomer and it may be either a unit derived from one hydrophilic group-containing monomer or a unit derived from two or more hydrophilic group-containing monomers. The hydrophilic group is not particularly limited and it may be either a dissociative group or a nonionic hydrophilic group.

The hydrophilic group is preferably a dissociative group from the viewpoint of promoting the self-dispersibility and stability of the formed emulsification or dispersion state and, more preferably, an anionic dissociative group. Examples of the dissociative group include a carboxyl group, a phosphoric acid group and a sulfonic acid group and, among these, a carboxyl group is preferred from the viewpoint of fixation when a water-based ink is composed.

The hydrophilic group-containing monomer is preferably a dissociative group-containing monomer and, preferably, a dissociative group-containing monomer having a dissociative group and an ethylenically unsaturated bond, from the viewpoint of self-dispersibility. Examples of the dissociative group-containing monomer include an unsaturated carboxylic acid monomer, an unsaturated sulfonic acid monomer and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethyl succinic acid.

Specific examples of the unsaturated sulfonic acid monomer include styrene sulfonic acid, 2-acrylamide-2-methylpropane sulfonic acid, 3-sulfopropyl(meth)acrylate, and bis-(3-sulfopropyl)-itaconate ester.

Specific examples of the unsaturated phosphoric acid monomer include vinylphosphonic acid, vinyl phosphate, bis(methacryloyloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, an unsaturated carboxylic acid monomer is preferred, an acrylic monomer is more preferred and, acrylic acid and methacrylic acid are particularly preferred from the viewpoints of the dispersion stability and ejection stability.

The self-dispersing polymer particles of the present invention have a carboxyl group from the viewpoint of self-dispersibility, and preferably contain a polymer having an acid value of from 25 to 100 mgKOH/g. Further, the acid value is more preferably from 25 to 80 mg KOH/g from the viewpoint of self-dispersibility, and still more preferably from 30 to 65 mg KOH/g. When the acid value is not smaller than 25 mg KOH/g, the self-dispersibility is stabilized, and when the acid value is not larger than 100 mg KOH/g, the particles have an advantage in the water-resistance.

The aromatic-group-containing monomer is not particularly limited as long as the monomer is a compound containing an aromatic group and a polymerizable group. The aromatic group may be a group derived from an aromatic hydrocarbon or from an aromatic heterocycle. In the present invention, the aromatic group is preferably an aromatic group derived from an aromatic hydrocarbon, from the viewpoint of stability of the particle shape in an aqueous medium.

The polymerizable group may be a condensation-polymerizable group or an addition-polymerizable group. The polymerizable group is preferably an addition-polymerizable group, and more preferably a group containing an ethylenically unsaturated bond, from the viewpoint of stability of the particle shape in an aqueous medium.

The aromatic-group-containing monomer is preferably a monomer having an aromatic group derived from an aromatic hydrocarbon and an ethylenically unsaturated bond. The aromatic-group-containing monomer may be used alone or may be used in combination of two or more kinds.

Examples of the aromatic-group-containing monomer include phenoxyethyl(meth)acrylate, benzyl(meth)acrylate, phenyl(meth)acrylate, and a styrene-based monomer. Among others, from the viewpoint of a balance between hydrophilicity and hydrophobicity of the polymer chain and ink fixation, an aromatic-group-containing (meth)acrylate monomer is preferred, and at least one selected from phenoxyethyl(meth)acrylate, benzyl(meth)acrylate and phenyl(meth)acrylate is more preferred, and phenoxyethyl(meth)acrylate and benzyl(meth)acrylate are still more preferred.

The term "(meth)acrylate" used herein refers to acrylate or methacrylate.

As the self-dispersing polymer, acrylic resins containing a constituent unit derived from a (meth)acrylate monomer are preferred, acrylic resins containing a constituent unit derived from an aromatic-group-containing (meth)acrylate monomer are more preferred, and acrylic resins containing a constituent unit derived from an aromatic-group-containing (meth)acrylate monomer and having the content of the constituent unit of from 10 to 95% by mass are still more preferred. When the content of the aromatic-group-containing (meth)acrylate monomer is from 10 to 95% by mass, stability of the self-emulsification or dispersion state is improved, and further, an increase in the ink viscosity can be suppressed. The content of the aromatic-group-containing (meth)acrylate monomer is preferably from 15 to 90% by mass, and further preferably from 15 to 80% by mass and particularly preferably from 25 to 70% by mass, from the viewpoints of stability of self-dispersion state, stability of the particle shape in an aqueous medium by hydrophobic interaction among aromatic rings and reduction in the content of water-soluble ingredients by an appropriate hydrophobization of particles.

The self-dispersing polymer can be constituted by using, for example, a constituent unit derived from an aromatic-group-containing monomer and a constituent unit derived from a dissociative-group-containing monomer. The self-dispersing polymer may further include another structural unit, as needed.

The monomer for forming another constituent unit is not particularly limited as long as the monomer is copolymerizable with the aromatic-group-containing monomer and the dissociative-group-containing monomer. In particular, an alkyl-group-containing monomer is preferable from the viewpoint of flexibility of the polymer skeleton and ease in control of the glass-transition temperature (Tg).

Specific examples of the monomer containing an alkyl group(s) include alkyl group-containing (meth)acrylate-based monomers (preferably the alkyl moiety has 1 to 4 carbon atoms) and alkyl group-containing (meth)acrylamide-based monomers. The alkyl group-containing (meth)acrylate-based monomers include alkyl(meth)acrylates such as methyl(meth)acrylate, ethyl(meth)acrylate, isopropyl(meth)acrylate, n-propyl(meth)acrylate, n-butyl(meth)acrylate, isobutyl(meth)acrylate, t-butyl(meth)acrylate, hexyl(meth)acrylate, and ethylhexyl(meth)acrylate; ethylenically unsaturated monomers containing a hydroxyl group such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, and hydroxyhexyl(meth)acrylate; dialkylaminoalkyl(meth)acrylates such as dimethylaminoethyl(meth)acrylate. Examples of the alkyl group-containing (meth)acrylamide-based-monomers include N-hydroxyalkyl(meth)acrylamides such as N-hydroxymethyl(meth)acrylamide, N-hydroxyethyl(meth)acrylamide, and N-hydroxybutyl(meth)acrylamide; N-alkoxyalkyl(meth)acrylamides such as N-methoxymethyl(meth)acrylamide, N-ethoxymethyl(meth)acrylamide, N-(n-, iso-)butoxymethyl(meth)acrylamide, N-methoxyethyl(meth)acrylamide, N-ethoxyethyl(meth)acrylamide, and N-(n-, iso-)butoxyethyl(meth)acrylamide.

The molecular weight of the water-insoluble polymer which configures the self-dispersing polymer particles is preferably from 3000 to 200,000, more preferably from 5,000 to 150,000, and still more preferably from 10,000 to 100,000, in terms of weight-average molecular weight. When the weight-average molecular weight is not smaller than 3,000, the amount of the water-soluble components can be effectively suppressed. When the weight-average molecular weight is not larger than 200,000, the self-dispersion stability can be enhanced.

The weight-average molecular weight is measured by a gel permeation chromatography (GPC). HLC-8220 GPC (manufactured by Tosoh Corporation) is used for the GPC, and TSKGEL SUPER HZM-H, TSKGEL SUPER HZ4000, and TSKGEL SUPER HZ2000 (all manufactured by Tosoh Corporation, 4.6 mm ID×15 cm) are used as the columns. The detail of the GPC is described in the paragraph [0076] of JP-A No. 2010-155359.

When the water-insoluble polymer which constitutes the self-dispersing polymer particles contains a structural unit derived from an aromatic-group-containing (meth)acrylate monomer (preferably a structural unit derived from phenoxyethyl(meth)acrylate and/or a structural unit derived from benzyl(meth)acrylate), the copolymerization ratio of the structural unit derived from the aromatic-group-containing (meth)acrylate monomer is preferably from 15 to 80% by mass with respect to the total mass of the self-dispersing polymer particles, from the viewpoint of regulating the hydrophilicity/hydrophobicity of the polymer.

The water-insoluble polymer, from the viewpoint of controlling the hydrophilicity/hydrophobicity of the polymer, preferably includes a structural unit derived from an aromatic-group-containing (meth)acrylate monomer with a copolymerization ratio of from 15 to 80% by mass, a structural unit derived from a carboxyl-group-containing monomer, and a structural unit derived from an alkyl-group-containing monomer (preferably a structural unit derived from an alkyl(meth)acrylate), and more preferably includes a structural unit derived from phenoxyethyl(meth)acrylate and/or a structural unit derived from benzyl(meth)acrylate with a total copolymerization ratio of from 15 to 80% by mass, a structural unit derived from a carboxyl-group-containing monomer, and a structural unit derived from an alkyl-group-containing monomer (preferably a structural unit derived from (meth)acrylic ester of an alkyl group having 1 to 4 carbon atoms). In addition to the above, the water-insoluble polymer preferably has the acid value of from 25 to 100 and the weight average molecular weight of from 3,000 to 200,000, and more preferably has the acid value of from 25 to 95 and the weight average molecular weight of from 5,000 to 150,000.

Hereinafter, specific examples of the water-insoluble polymer which constitutes the polymer particles are described (exemplified compounds B-01 to B-19), but the present invention is not limited thereto. The numbers in the parentheses represent the mass ratio of the copolymer components.

B-01: Phenoxyethyl acrylate/methyl methacrylate/acrylic acid copolymer (50/45/5)
B-02: Phenoxyethyl acrylate/benzyl methacrylate/isobutyl methacrylate/methacrylic acid copolymer (30/35/29/6)
B-03: Phenoxyethyl methacrylate/isobutyl methacrylate/methacrylic acid copolymer (50/44/6)
B-04: Phenoxyethyl acrylate/methyl methacrylate/ethyl acrylate/acrylic acid copolymer (30/55/10/5)
B-05: Benzyl methacrylate/isobutyl methacrylate/methacrylic acid copolymer (35/59/6)
B-06: Styrene/phenoxyethyl acrylate/methyl methacrylate/acrylic acid copolymer (10/50/35/5)
B-07: Benzyl acrylate/methyl methacrylate/acrylic acid copolymer (55/40/5)
B-08: Phenoxyethyl methacrylate/benzyl acrylate/methacrylic acid copolymer (45/47/8)
B-09: Styrene/phenoxyethyl acrylate/butyl methacrylate/acrylic acid copolymer (5/48/40/7)
B-10: Benzyl methacrylate/isobutyl methacrylate/cyclohexyl methacrylate/methacrylic acid copolymer (35/30/30/5)
B-11: Phenoxyethyl acrylate/methyl methacrylate/butyl acrylate/methacrylic acid copolymer (12/50/30/8)
B-12: Benzyl acrylate/isobutyl methacrylate/acrylic acid copolymer (93/2/5)
B-13: Styrene/phenoxyethyl methacrylate/butyl acrylate/acrylic acid copolymer (50/5/20/25)
B-14: Styrene/butyl acrylate/acrylic acid copolymer (62/35/3)
B-15: Methyl methacrylate/phenoxyethyl acrylate/acrylic acid copolymer (45/51/4)
B-16: Methyl methacrylate/phenoxyethyl acrylate/acrylic acid copolymer (45/49/6)
B-17: Methyl methacrylate/phenoxyethyl acrylate/acrylic acid copolymer (45/48/7)
B-18: Methyl methacrylate/phenoxyethyl acrylate/acrylic acid copolymer (45/47/8)
B-19: Methyl methacrylate/phenoxyethyl acrylate/acrylic acid copolymer (45/45/10)

The polymer particles in the present invention are preferably polyurethane resin particles from the viewpoint of enhancing continuous ejection properties and ejection stability of the water-based ink. Since polyurethane resins are less likely to cause deterioration by photodecomposition compared with acrylic polymer, an image formed with a polyurethane resins-containing ink has excellent light resistance.

As the polyurethane resins particles, particles that contain at least one of resins represented by the following UP-1 to UP-4 are suitable.

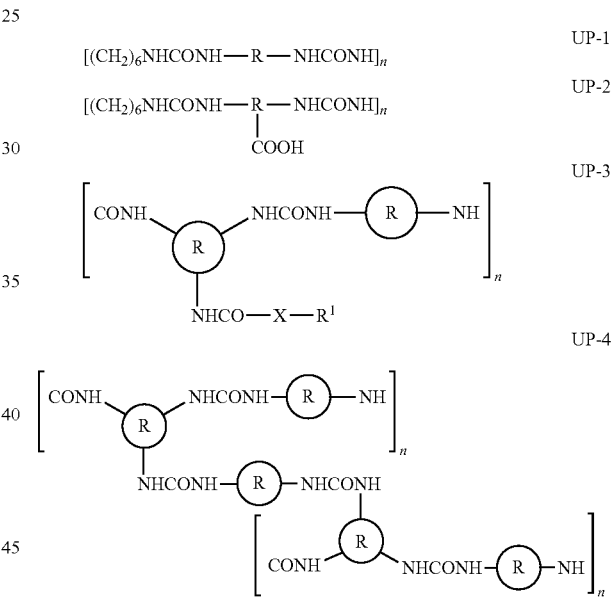

In the above-mentioned UP-1 to UP-4, R represents an aliphatic group or an aromatic group. $R^1$ represents $-(CH_2)_m-COOH$ or $-(CH_2CH_2O)_p-CH_3$ wherein m represents an integer from 1 to 10 and p represents integer from 1 to 100. X represents NH or O. n represents an arbitrary integer.

A preferable embodiment of the polyurethane resins represented by UP-1 to UP-4 is that the resins contain an acidic group from the viewpoint of improving the stability of polyurethane particles.

The polyurethane resins represented by UP-1 to UP-4 and the method of producing preferable embodiments thereof are not particularly limited, and for example, a production method described in JP-A No, 2006-241457 is suitable. That is, the suitable method is a production method in which an emulsion containing an isocyanate compound and an anionic surfactant is prepared, and a bifunctional, trifunctional or multifunctional reactant is added thereto and the resultant mixture is stirred to generate a urethane resin.

Further, as for the polymer particles used in the present invention, those including polyurethane having a structure represented by the following Formula (PU-1) are especially preferable.

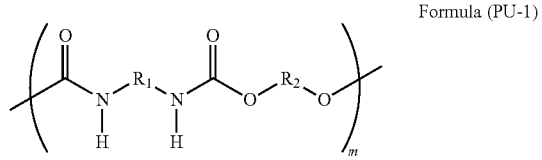

Formula (PU-1)

In Formula (PU-1), $R_1$ represents an aliphatic group or an aromatic group; $R_2$ represents a residue of a diol compound; and m represents an integer. m may be appropriately selected in a range such that the following molecular weight are filled.

Examples of the aliphatic group represented by $R_1$ include a divalent group derived from isophorone diesocyanate (IPDI), hydrogenated m-xylenediisocyanate (H6XDI), hydrogenated diphenylmethane diisocyanate (H12MDI), hexamethylene diisocyanate (HDI) and the like.

Examples of the aromatic group represented by $R_1$ include a divalent group derived from m-xylene diisocyanate (XDI), tolylene diisocyanate (TDI), diphenylmethane diisocyanate (MDI) and the like.

Among these, from the viewpoint of image durability, it is more preferable for $R_1$ to be an aliphatic group. It is estimated that by selecting a relatively flexible structure, flexibility of the ink film after ink has been fixed on a base material is improved, which results in enhancement of image durability.

$R_2$ represents a residue of a diol compound, and the residue is preferably selected from an alkylene group, a polyether group, a polyester group, a polycarbonate group and a polycaprolactone group. The residue is more preferably an alkylene group, a polyether group, a polyester group, or a polycaprolactone group, and especially preferably an alkylene group having 1 to 30 carbon atoms, an alkylether group having 2 to 60 carbon atoms, or an alkylester group having 2 to 30 carbon atoms. It is estimated that by selecting a relatively flexible structure, flexibility of the ink film after ink has been fixed on a base material is improved, which results in enhancement of image durability.

The polymer particles may or may not have a cross-linked structure inside. From the viewpoint of image fixation, polymer particles having no cross-linked structure are more preferable.

The molecular weight of the polyurethane particles in terms of weight-average molecular weight is in a range of preferably from 3000 to 200000, and more preferably from 5000 to 150000. The weight-average molecular weight is a polystyrene-equivalent value obtained by measurement in accordance with Gel Permeation Chromatography (GPC). The measurement conditions are described below.

Conditions
GPC: HLC-8220 GPC manufactured by TOSHO CORPORATION
Column: TSKgeL SuperHZM-H, TSKgeL SuperHZ4000, TSKgeL SuperHZ2000 (all manufactured by TOSHO CORPORATION)
Mobile phase solvent: Tetrahydrofurane
Standard sample: Standard polystyrene
Flow rate: 0.35 ml/min
Column temperature: 40° C.

As the polyurethane resin particles, commercially available products may be used, and examples thereof include ACRIT WBR-016U (Tg: 20° C.), ACRIT WEM-321U (Tg: 20° C.), ACRIT WBR-2018 (Tg: 20° C.), ACRIT WBR-2000U (Tg: 45° C.), ACRIT WBR-600U (Tg: −30° C.), all manufactured by Taisei Fine Chemical Co., Ltd., IMPRANIL DLP-R (trade name, Tg: 21° C.), IMPRANIL DLN (trade name, Tg: −55° C.), IMPRANIL DLC-F (trade name, Tg: −42° C.), BAYHYDROL UH XP 2648 (trade name, Tg: −51° C.), DESPADOL U-53 (trade name, Tg: −58° C.), all manufactured by SUMIKA BAYER URETHANE CO., LTD., PERMARINE UA-150 (trade name, Tg: 36° C.) manufactured by Sanyo Chemical Industries Ltd., UW-1005-E (trade name, Tg: −30° C.) and UW-5101-E (trade name, Tg: 69° C.), all manufactured by Ube Industries, Ltd.

The production method of the water-insoluble polymer constituting the polymer particles is not particularly limited, and examples thereof include a method of performing emulsion polymerization in the presence of a polymerizable surfactant, thereby forming a covalent bond between the surfactant and the water-insoluble polymer, or a method of copolymerizing a monomer mixture containing a hydrophilic-group-containing monomer and an aromatic-group-containing monomer in accordance with a known polymerization method such as a solution polymerization method or a bulk polymerization method. Among the above polymerization methods, a solution polymerization is preferable, and a solution polymerization method using an organic solvent is more preferable, from the viewpoint of ejection stability of an ink in which the polymer particles are contained.

The polymer particles preferably contain a polymer synthesized in an organic solvent, wherein the polymer has carboxyl groups, all or some of the carboxyl groups of the polymer are neutralized (to give an acid value of preferably from 1 to 50 mgKOH/g), and the polymer is prepared in the form of a polymer dispersion in which water constitutes the continuous phase. In other words, the production of the polymer particles in the present invention preferably includes a process of synthesizing a polymer in an organic solvent and a dispersing process of forming an aqueous dispersion in which at least a part of the carboxyl groups of the polymer are neutralized.

The dispersion process preferably includes the following process (1) and process (2):

Process (1): a process of stirring a mixture containing a polymer (water-insoluble polymer), an organic solvent, a neutralizer and an aqueous medium Process (2): a process of removing the organic solvent from the mixture The process (1) is preferably a process of first dissolving the polymer (water-insoluble polymer) in an organic solvent, and then slowly adding a neutralizer and an aqueous medium thereto, and mixing and stirring the mixture to obtain a dispersant. In this way, by adding a neutralizer and an aqueous medium into a solution of the water-insoluble polymer dissolved in an organic solvent, self-dispersing polymer particles having a particle size with improved storage stability can be obtained without requiring a strong shear force. The method of stirring the mixture is not particularly limited, but any of commonly used mixing and stirring apparatuses and, as needed, a disperser such as an ultrasonic disperser or a high pressure homogenizer can be used.

Preferable examples of the organic solvent include alcohol-based solvents, ketone-based solvents and ether-based solvents. For the detail of these organic solvent, the description in paragraph [0109] of JP-A No. 2011-42150 can be referred to. Among these solvents, ketone-based solvents such as methyl ethyl ketone and alcohol-based solvents such as isopropyl alcohol are preferred. It is also preferable to use isopropyl alcohol and methyl ethyl ketone in combination from the viewpoint that the polarity change during the phase inversion from an oil system to an aqueous system becomes mild. By using these solvents in combination, aggregation/precipitation or fusion between particles is not caused, and self-dispersing polymer particles in fine particle size that exerts high dispersion stability can be obtained.

The neutralizing agent is used to partially or entirely neutralize dissociative groups so that the self-dispersing polymers can form a stable emulsion or dispersion state in water. In the case where the self-dispersing polymer has an anionic dissociative group (for example, a carboxyl group) as the dissociative group, examples of the neutralizing agent to be used include basic compounds such as organic amine compounds, ammonia, and alkali metal hydroxides. For the detail of these neutralizers, the description in paragraph [0110] of JP-A No. 2011-42150 can be referred to. Among them, sodium hydroxide, potassium hydroxide, triethylamine, and triethanolamine are preferred from the viewpoint of stabilization of dispersion of the self-dispersing polymer particles into water.

These basic compounds are preferably used in an amount of from 5 mol % to 120 mol % with respect to 100 mol % of the dissociative group. The details of the ratio herein are described in paragraph [0110] of JP-A No. 2011-42150.

In the process (2), an aqueous dispersion of polymer particles can be obtained by distilling off the organic solvent from the dispersion obtained in the process (1) by a conventional method such as vacuum distillation, thereby causing phase inversion into an aqueous system. The organic solvent in the obtained aqueous dispersion is substantially removed, and the amount of the organic solvent is preferably not larger than 0.2% by mass, and more preferably not larger than 0.1% by mass.

The average particle size of the polymer particles (in particular, self-dispersing polymer particles) is preferably in a range of from 10 to 400 nm, more preferably in a range of from 10 to 200 nm, further preferably in a range of from 10 to 100 nm, and particularly preferably in a range of from 10 to 50 nm in terms of volume-average particle size. When the average particle size is not smaller than 10 nm, production suitability is improved. When the average particle size is not larger than 400 nm, storage stability is improved. The particle-size distribution of the polymer particles is not particularly limited, and either of polymer particles having broad particle-size distribution and polymer particles having monodisperse particle-size distribution may be employed. Further, two or more types of water-insoluble particles may be mixed.

The average particle diameter and the particle size distribution of the polymer particles are obtained by measuring volume-average particle size by a dynamic light scattering method, using a NANOTRAC particle size distribution analyzer UPA-EX150 (manufactured by NIKKISO Co., Ltd.).

The glass-transition temperature (Tg) of polymer particle is preferably from −58° C. to 69° C., more preferably from −40° C. to 69° C. and still more preferably from 0° C. to 60° C. from the viewpoint of storage stability of the water-based ink.

When the glass-transition temperature is in the above-mentioned range, the image is less likely to have hardness or stickiness, and has a good texture such as hand feeling (for example, without hardness and stickiness of an image), and at the same time rub fastness of the image can be further improved.

Polymer particles (particularly, self-dispersing polymer particles) can be used alone or by mixing two or more types thereof.

The content of polymer particle in the water-based ink is preferably from 1 to 30% by mass and more preferably from 5 to 15% by mass with respect to the total amount of the ink, from the viewpoint of rub fastness.

Further, regarding the content ratio of the polymer particles to the colorant in an ink, the mass ratio of the polymer particles:the colorant is preferably from 0.1:1 to 30:1, more preferably from 0.1:1 to 10:1 and especially preferably from 0.1:1 to 5:1.

Regarding the content ratio of the polymer particles to the wax particles in an ink, the mass ratio of the polymer particles:the wax particles is preferably from 0.1:1 to 20:1, more preferably from 0.5:1 to 20:1 and especially preferably from 0.5:1 to 10:1.

Wax Particle

The water-based ink of the present invention contains at least one type of wax particles. By incorporation of wax particles, the coefficient of friction of the image is decreased, rub fastness is improved and texture such as hand feeling (for example, free from hardness and stickiness of the image) becomes good.

The wax particles in the present invention mean a collective entity of a low molecular compound having a molecular weight of less than 3000 in a particle state. Accordingly, the wax particles are distinguished from a collective entity of the above-described polymer particles having a molecular weight of 3000 or more in a particle state.

The content of the wax particles in the water-based ink is from 0.5% by mass to less than 8% by mass in terms of wax particle solid concentration with respect to the total amount of the ink. When the content of wax particles in the water-based ink is not smaller than 8% by mass, the ejection property becomes impaired, hardness or stickiness is generated on the image, which results in the loss of texture, and at the same time rub fastness is conspicuously deteriorated. The content of not less than 0.5% by mass represents that wax particles are substantially contained.

The content of wax particles in water-based ink is preferably from 1% by mass to less than 8% by mass, and more preferably from 1% by mass to 6% by mass.

Examples of the wax particles include natural wax particles and synthetic wax particles.

Examples of the natural wax include petroleum-derived wax, plant wax and animal/plant wax. Examples of the petroleum-derived wax include paraffin wax, microcrystalline wax and petrolatum. Examples of the plant wax include Carnauba wax, Candelilla wax, rice wax and Japan wax. Examples of the animal/plant wax include lanolin and beewax.

Examples of the synthetic wax include synthetic hydrocarbon-based wax and modified wax. Among these, examples of the synthetic hydrocarbon-based wax include polyethylene wax, Fischer-Tropsch wax, and examples of the modified wax include paraffin wax derivatives, montan wax derivatives, microcrystalline wax derivatives.

Among the above-mentioned wax, Carnauba wax is preferred from the viewpoint of improving rub fastness of the image, and is preferred from the viewpoint of improving the image strength in the post-process of an image sample (the making of a booklet or the like). Paraffin wax containing, as a main component, hydrocarbon having 20 to 40 carbon atoms is preferred from the viewpoint of gloss of the image, prevention of water evaporation from the nozzle tip and an excellent water-retaining effect. Polyethylene wax is preferred from the viewpoint that the wax has an excellent compatibility with resins and is likely to produce a uniform and favorable image. From the viewpoint of giving wettability, polyethylene wax is preferred. Polyethylene wax is easily modified. For example, by glycol-modified polyethylene wax in which wax is modified with glycol, wetting effect is obtained due to glycol. Accordingly, the glycol-modified polyethylene wax is effective in keeping wettability of the water-based ink at the nozzle tip. Polyethylene wax is preferred from the viewpoint of capable of maintaining still higher ejection stability by containing polyethylene wax.

Among the above-mentioned wax, from the viewpoint of improving rub fastness, linear higher fatty acid ester wax particles and hydrocarbon-based wax particles are preferred.

The melting point (Tm) of the wax particle is preferably from 50° C. to 150° C., more preferably from 50° C. to 140° C. When the melting point is not lower than 50° C., image slipperiness is improved and rub fastness is further improved. Also when the melting point is not higher than 150° C., image slipperiness is improved and rub fastness is more improved.

The wax may be contained in an ink in any of forms such as the state of a solution in which the wax is dissolved in an appropriate solvent, or the state of emulsion dispersion or solid particle dispersion. The wax is preferably added to a solvent in a form of dispersion in which wax is dispersed in the particle state. For example, the wax is suitably used in a form of water dispersion in which a particulate wax is dispersed in water (concretely, either of emulsion (emulsion dispersion) or suspension (solid particle dispersion)).

Examples of the method of emulsifying and dispersing method include a method in which dissolution is performed by using oils such as dibutyl phthalate, tricresyl phosphate, dioctyl sebacate or tri(2-ethylhexyl)phosphate and auxiliary solvents such as ethyl acetate or cyclohexanone, and then an emulsifying dispersant is added thereto, thereby mechanically preparing an emulsion dispersion. In this case, for the purpose of adjusting viscosity or refractive index of oil droplets, it is also preferred that α-methyl styrene oligomer or poly(t-butyl acrylamide) or the like is added.

Examples of the method of dispersing solid particle include a method in which a lubricant powder is dispersed in an appropriate solvent such as water by ball mill, colloid mill, vibratory ball mill, sand mill, jet mill, roller mill or ultrasonic wave to obtain a solid dispersion. In this time, protective colloids (for example, polyvinyl alcohol), surfactants (for example, anionic surfactants such as sodium triisopropyl naphthalene sulfonate (a mixture in which three substitution positions of isopropyl group are different from one another)) may be used. In the above-mentioned mill, generally, beads such as zirconia are used as a dispersing medium. In the water dispersion, a preservative (for example, a sodium salt of benzisothiazolinone) may be contained.

Wax is preferably used as emulsion dispersion in accordance with an emulsifying and dispersing method. In this case, the average particle size of dispersed particles (wax particles) in the emulsion dispersion is preferably from 0.01 μm to 10 μm, more preferably from 0.05 μm to 5 μm and still more preferably from 0.1 μm to 2 μm. The emulsifying and dispersing method and the dispersion obtained by the method are described below.

The wax is suitably used in the state of emulsion dispersion by using an emulsifying dispersant.

The emulsifying dispersant can be used by appropriately selecting from conventionally known emulsifying dispersants. Among these, a preferable emulsifying dispersant is represented by the following Formula (1).

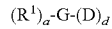  Formula (1)

In Formula (1), $R^1$ represents a linear, branched or cyclic alkyl group having 10 to 60 carbon atoms, a linear, branched or cyclic alkenyl group having 10 to 60 carbon atoms, a linear, branched or cyclic aralkyl group having 10 to 60 carbon atoms or an aryl group having 10 to 60 carbon atoms, and these groups optionally have substituent.

Preferred examples of $R^1$ include an alkyl represented by $C_gH_{2g+1}$ (g represents an integer from 10 to 60) and an aryl groups having 10 to 60 carbon atoms. Specific examples thereof include a dodecyl group, a myristyl group, a cetyl group, a stearyl group, an oleyl group, an eicosyl group, a docosanyl group, a triacontanyl group, a tetracontanyl group, a heptacontanyl group, a dinonylphenyl group, a didodecylphenyl group, a tetradecylphenyl group, a tripentylphenyl group and a dodecylnaphthyl group.

G represents a divalent to heptavalent, preferably divalent to pentavalent, more preferably divalent to tetravalent and still more preferably divalent or trivalent linking group, or a single bond. G is preferably an alkylene group, an arylene group or a composite group thereof. G may be an oxygen atom, an ester group, sulfur, an amide group, or a sulfonyl group, or a divalent substituted or unsubstituted linking group interrupted by a heteroatom such as sulfur. G is particularly preferably an oxygen atom, an ester group or an amide group.

D represents a polyoxy alkylene group represented by $(B)_n$-E. B represents —$CH_2CH_2O$—, —$CH_2CH_2CH_2O$—, —$CH(CH_3)CH_2O$— or —$CH_2CH(OH)CH_2O$—, and B is preferably —$CH_2CH_2O$—.

n represents an integer from 1 to 50, and is preferably an integer from 5 to 30.

E represents a hydrogen atom, an alkyl group having 1 to 8 carbon atoms, an aryl group, an alkyl carbonyl group having 2 to 8 carbon atoms, or an aryl carbonyl group, and these may be substituted or unsubstituted.

The alkyl group having 1 to 8 carbon atoms is preferably a methyl group, an ethyl group, a propyl group, a butyl group, a hexyl group and a cyclohexyl group, and particularly preferably, a methyl group, an ethyl group and a propyl group.

The aryl group is preferably a phenyl group.

The alkyl carbonyl group having 2 to 8 carbon atoms is preferably an acetyl group, a propionyl group, a butyroyl group, a pivaloyl group, a cyclohexylcarbonyl group, and particularly preferably an acetyl group.

The aryl carbonyl group is preferably a benzoyl group.

E is particularly preferably, a hydrogen atom, a methyl group, an ethyl group, a propyl group, an acetyl group, a propionyl group or a benzoyl group.

a and d each independently represents an integer from 1 to 6.

When plural $R^1$ or D exist, that is, plural $R^1$, B or E exist, each $R^1$, each B, or each E may be the same or different from one another.

The dispersant represented by Formula (1) is desired to have low water-solubility, and preferably have a solubility with respect to water of not higher than 0.5% by mass (25° C.), and further preferably not higher than 0.1% by mass.

Hereinafter, concrete examples of the compound represented by Formula (1) are listed, but not limited thereto.

  WA-1

  WA-2

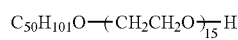  WA-3

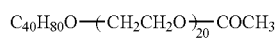

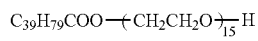

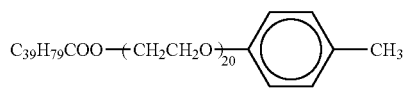

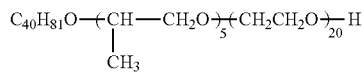

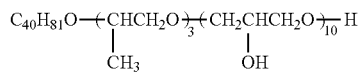

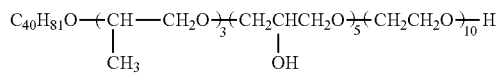

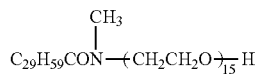

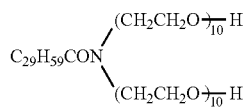

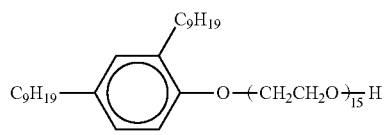

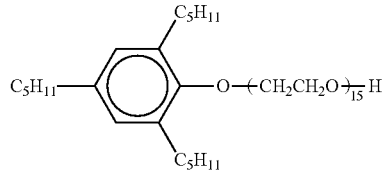

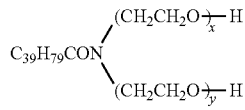

$x + y = 20$

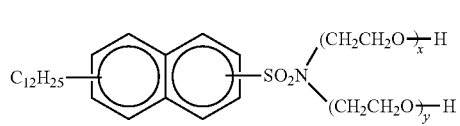

WA-4  $x + y = 12$

WA-5

WA-6

WA-7

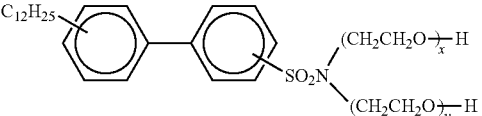

WA-8

$x + y = 15$

WA-9

WA-10

WA-11

WA-12

WA-13

WA-14

WA-15

WA-16

WA-17

WA-18

As a solvent that can be used when adding wax particles in a form of dispersion, water is preferred. However, the solvent is not limited to water, and, for example, common organic solvent may be appropriately selected to use it at the time of dispersion. For the organic solvent, the description in the paragraph [0027] of JP-A No. 2006-91780 can be referred to. By using an organic solvent, stability of the dispersion of a lubricant is enhanced. The organic solvent may be used as a mixture composed of two or more solvents of the same type or different types from one another.

The component ratio of wax and the dispersant represented by Formula (1) in the dispersed wax particles including both the wax and the dispersant is not particularly limited, and the content ratio of the wax particles is preferably from 25 to 99% by mass and the content ratio of the dispersant is preferably from 1 to 75% by mass. By setting the content ratio of the wax in the above range, a performance of the dispersed wax particles is enhanced. Therefore, the lower content ratio of the dispersant of Formula (1) in the dispersed wax particles is more preferable.

Dispersed wax particles are preferably made by preliminarily mixing compounds at a temperature which is higher than the melting point of the compound having the higher melting temperature of the compounds, thereby so-called "melt mixing" before these compounds are dispersed. In advance, an organic solvent which becomes a dispersing medium is heated at a high temperature in the above-mentioned manner, and then a molten mixture is added thereto, and then the molten mixture is finely dispersed in accordance with a variety of dispersion methods. It is also preferred that a heated organic solvent is added to the molten mixture, and then the resultant mixture is finely dispersed. Alternatively, after dissolving a wax and a dispersant in a non-aqueous organic solvent which dissolves the wax or the dispersant, the wax and the dispersant are finely dispersed in water by using other water-soluble surfactants. The obtained dispersion may be added directly as dispersed wax particles. As the non-aqueous organic solvent, for example, ethyl acetate is preferred.

After dispersion, the organic solvent is removed therefrom, and when the remaining is used as a wax particle dispersion, melt mixing is possible in an organic solvent at a low temperature even when the melting points of the wax and the compound represented by Formula (1) is not lower than 100° C., and high-melting point dispersed lubricant particles can be prepared in the water-based system. Here, the melting points of the wax and the compound represented by Formula (1) are not particularly limited; however it is preferably from 50° C. to 200° C., more preferably from 60° C. to 200° C. and still more preferably 80° C. to 150° C.

Among the above-mentioned solvents, water is most preferred, from the viewpoint of a decrease in burdens of environment during preparation of a water-based ink. When a lubricant having a melting point of 80° C. is used with water, it is preferable for the lubricant to be dispersed in water by increasing the temperature of water to 80° C. or more.

Water Soluble Organic Solvent

The water-based ink of the present invention contains water as a solvent, and at the same time, may contain a water-soluble organic solvent. By containing a water soluble organic solvent together with polymer particles, the minimum film-forming temperature of the polymer particles can be maintained low in the ink, and ejection properties or the like can be favorably maintained.

Here, the term "water-soluble" means solubility of at least 1% by mass in water at 20° C.

As the water soluble organic solvent that constitutes the water-based ink, alkyleneoxy alcohol and/or alkyleneoxy alkylether are preferred. By containing any of these organic solvents, curling of the recorded matter can be suppressed in a high humidity environment.

The alkyleneoxy alcohol is preferably a propyleneoxy alcohol. Examples of the propyleneoxy alcohol include SANNIX GP250 and SANNIX GP400 (all manufactured by Sanyo Chemical Industries, Ltd.).

The alkylene oxyalkylether is preferably an ethylene oxyalkylether whose alkyl moiety has 1 to 4 carbon atoms, or a propylene oxyalkylether whose alkyl moiety has 1 to 4 carbon atoms.

Examples of the alkylene oxyalkyl ether include ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether.

In addition to the above-mentioned water soluble organic solvent, other organic solvents may be contained from the viewpoint of obtaining drying prevention, penetration promotion, viscosity adjustment or the like.

In the case where an organic solvent is used as an anti-drying agent, when an image recording is performed by ejecting a water-based ink using an inkjet method, nozzle clogging due to drying of ink at an ink ejection port can be effectively prevented. For drying prevention, a water-soluble organic solvent having a lower vapor pressure than water is preferably used. Concrete examples of water soluble organic solvent suitable for prevention of drying include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, gricerin or trimethylolpropane; heterocycles such as 2-pyrrolidone, N-methyl-2-pyrrolidone, 1,3-dimethyl-2-imidazolidinone, or N-ethylmorpholine; sulfur-containing compounds such as sulfolane, dimethylsulfoxide, or 3-sulfolene; multifunctional compounds such as diacetone alcohol or diethanol amine; and urea derivatives. Among these, a polyhydric alcohol such as glycerin or diethylene glycol is preferred.

For promotion of penetration, an organic solvent may be used in order to improving penetration of a water-base ink into a recording medium. Specific examples of the organic solvents suitable for promoting penetration include alcohols such as ethanol, isopropanol, butanol or 1,2-hexanediol; sodium lauryl sulfate, sodium oleate and a nonionic surfactant.

The water-soluble organic solvent may be used also for adjusting the viscosity of the ink composition. Specific examples of the water-soluble organic solvent that may be used for viscosity adjustment include alcohols (such as methanol, ethanol or propanol), amines (such as ethanol amine, diethanol amine, triethanol amine, ethylenediamine or diethylenetriamine) and other polar solvents (such as formamide, N,N-dimethylformamide, N,N-dimethylacetamide, dimethylsulfoxide, sulfolane, 2-pyrrolidone, acetonitrile or acetone).

Water

The water-based ink of the present invention contains water, and the content of water in the ink is not particularly limited. From the viewpoint of securing stability and ejection liability, the content of water in the ink is preferably from 10 to 99% by mass, and more preferably from 20 to 70% by mass with respect to the total mass of the water-based ink.

Surfactant

For the water-based ink of the present invention, a wide variety of surfactants can be used. Among others, an embodiment of containing an acetylene glycol-based surfactant is preferred.

When compared to other surfactants, the acetylene glycol-based surfactant is easy to optimize surface tension and interfacial tension between an ink and an inkjet head member (head nozzle, or the like) in contact with the ink, and is hardly foamed. For these reasons, the ejection stability at the time when the water-based ink is ejected can be improved. By containing the acetylene glycol-based surfactant, the wettability or permeability to a recording medium becomes favorable, and the unevenness of the density or blur of the ink can be restrained, which is advantageous for fine image formation.

Examples of the acetylene glycol-based surfactant include SURFYNOL 104, SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 104S, SURFYNOL 420, SURFYNOL 440, SURFYNOL 465, SURFYNOL 485, SURFYNOL SE, SURFYNOL SE-F, SURFYNOL 504, SURFYNOL 61, SURFYNOL DF37, SURFYNOL CT111, SURFYNOL CT121, SURFYNOL CT131, SURFYNOL CT136, SURFYNOL TG, SURFYNOL GA (all manufactured by Air Products and Chemicals. Inc.), OLFINE B, OLFINE Y, OLFINE P, OLFINE A, OLFINE STG, OLFINE SPC, OLFINE E1004, OLFINE E1010, OLFINE PD-001, OLFINE PD-002W, OLFINE PD-003, OLFINE PD-004, OLFINE EXP.4001, OLFINE EXP.4036, OLFINE EXP.4051, OLFINE AF-103, OLFINE AF-104, OLFINE AK-02, OLFINE SK-14, OLFINE AE-3 (all manufactured by Nissin Chemical Industry Co., Ltd), ACETYLENOL E00, ACETYLENOL E00P, ACETYLENOL E40 and ACETYLENOL E100 (all manufactured by Kawaken Fine Chemicals Co., Ltd.).

The content of the surfactant in the water-based ink is preferably from 0.1 to 1.5% by mass and more preferably from 0.5 to 1.0% by mass with respect to the total amount of the water-based ink. When the content is not smaller than 0.1% by mass, the ink easily wets and spreads uniformly into the fiber of the recording base material, and rub fastness of the image becomes favorable and image bleeding is suppressed, thereby obtaining a homogeneous image. When the content is not larger than 1.5%, the water-based ink exhibiting excellent storage stability and ejection stability can be obtained.

2-Pyrrolidone

The water-based ink of the present invention preferably contains 2-pyrrolidone.

2-pyrrolidone functions as a wetting agent, and by containing the 2-pyrrolidone, the permeability of the water-based ink is improved, so that the 2-pyrrolidone has an effect of extending the average length of ink droplet which adheres to a fiber of the recording base material.

The content of 2-pyrrolidone in the water-based ink is preferably from 0.5% by mass to 50% by mass, and more preferably from 0.5% by mass to 30% by mass with respect to the total amount of the ink, from the viewpoint of giving permeability to the ink and giving the ink an effect of extending the diameter of the droplet (herein, average length). The content is particularly preferably from 1% by mass to 30% by mass, from the viewpoint of combining an effect of extending a dot size and rub fastness of the image.

Others

The water-based ink of the present invention may contain other additives as needed in addition to the above-mentioned components. Examples of the other additives include known additives such as a lubricant, an anti-fading agent, an emulsion stabilizer, a permeation enhancer, an ultraviolet absorber, a preservative, an antifungal agent, a pH adjusting agent, a surface tension adjusting agent, an antifoaming agent, a viscosity adjusting agent, a dispersant, a dispersion stabilizer, an anti-corrosive and a chelating agent. These additives may be added directly to the ink after the preparation of the water-based ink, or may be added to the water-based ink during the preparation of the ink.

The water-based ink of the present invention may further contain lubricants other than waxes together with the wax particles from the viewpoint of improvement in rub fastness. Lubricants other than waxes are not particularly limited as long as the lubricant has a function of reduction in coefficient of friction of the surface of the image. Examples of the lubricant include an ester compound, a silicone compound, a fluorine compound, a higher aliphatic acid or salts thereof, a fatty acid amide compound (preferably carboxylic acid amide compound) and an organic or inorganic matting agent. The details of these lubricants are described in the paragraphs [0037] to [0041] of JP-A No. 2010-155359. Among others, a silicone oil having a structure represented by "—(—Si$(CH_3)_2)_n$—" and 1-pentadecyl-2-hexadecylphthalic acid diester and palmitic acid amide are suitable.

The details of additives other than the lubricants are described in paragraphs [0098] to [0105] of JP-A No. 2010-155359.

Recording Base Material

In the image forming method of the present invention, a recording base material which is an aggregate of a non-absorptive or low-absorptive fiber material is used. The recording base material refers to a recording material on which an image is recorded by an inkjet method.

The expression "non-absorptive" or "low-absorptive" refers to the degree of absorption of a water-based ink on a recording base material. Since the ink is water-based, the degree of absorption can be evaluated by the water absorptive property.

That is, in the present invention, the "non-absorptive fiber material" comprises a fiber having a composition in which water absorption over 24 hrs. is less than 0.2% by mass in accordance with ASTM test method ASTM D570, and the "low-absorptive fiber material" comprises a fiber having a composition in which water absorption (, 24 hr.) is from 0.2% by mass to less than 0.5% by mass in accordance with ASTM test method ASTM D570 which is incorporated by reference herein.

Examples of the non-ink-absorptive or the low-ink-absorptive fiber materials include: polyolefin fibers (such as polypropylene fiber or polyethylene fiber); polyester fibers (such as polyethylene terephthalate fiber or polyethylene naphthalate fiber); synthetic fibers such as aramid fiber, cellulose fiber, nylon fiber, vinylon fiber, or rayon fiber; metal fibers such as stainless steel fiber, iron fiber, gold fiber, silver fiber, or aluminum fiber; and glass fiber (such as glass wool).

Examples of the aggregate of a non-ink-absorptive or low-ink-absorptive fiber material include a nonwoven fabric, a textile and a glass wool.

The "nonwoven fabric" refers to a sheet fabric which is formed not by weaving fibers but by entwining fibers, and includes in-water confounding nonwoven fabric. The nonwoven fabric is a processed sheet, web or batt which is one-directionally or irregularly oriented and fixed by friction, sticking, adhesion or the like. The nonwoven fabric does not include woven or knitted fibers, or stitchbonded fibers by incorporating bunch, string or filament bond or felted fibers by wet-milling.

In the present invention, among the above, nonwoven fabric is preferred from the viewpoint of low cost, processability, and from the viewpoint of relatively low rub fastness of the image and easiness of bleeding of the image which make it possible to expect that the effects of the present invention are further effectively achieved. Polyolefin fiber nonwoven fabric is more preferred.

The recording base material in the present invention preferably has a diameter of from 1 to 200 μm, more preferably from 1 to 100 μm and particularly preferably from 5 to 60 μm in terms of a fiber diameter (size) of a cross-section orthogonal to a fiber axis direction of fibers that constitute the recording base material. When the fiber size is not smaller than 1 μm, the recording base material has an advantage with regard to rub fastness of the image and the resilience of the recording base material for itself, and when the fiber size is not larger than 200 μm, the recording base material has an advantage with regard to image bleeding or texture of the recording base material.

The thickness of the recording base material is preferably from 1 to 1000 μm, and more preferably from 1 to 800 μm, further preferably from 5 to 500 μm and particularly preferably 5 to 300 μm. When the thickness is not smaller than 1 μm, the recording base material has an advantage with regard to the resilience of the recording base material, and when the thickness is not larger than 1000 μm, the recording base material has an advantage with regard to texture.

The density of the recording base material (fiber area density) is preferably from 1 to 300 g/m$^2$, more preferably from 1 to 200 g/m$^2$ and particularly preferably from 5 to 100 g/m$^2$. When the fiber area density is not smaller than 1 g/m$^2$, the recording material has an advantage in that a good image density is easily obtained, and when the fiber area density is not larger than 300 g/m$^2$, the recording material has an advantage with regard to rub fastness of the image and image bleeding.

The "fiber area density" refers to the ratio [g/m$^2$] of the amount of fibers existing in a surface where the fibers are distributed in two dimensions, to the area of the surface. The fiber area density is a value determined by measuring the weight of the unit area cut from the recording base material.

The recording base material may be formed by any of melt-blowing, spun-bonding, solvent-spinning, electrospinning, carding or the like.

Pretreatment Process

In the image forming method of the present invention, it is preferred that a pretreatment process, in which a pretreatment is performed by subjecting a recording base material to a hydrophilic treatment, be provided prior to the ink applying process. By the hydrophilic treatment, repellence of the ink which is prepared for a water-based ink is prevented, and an ink area where the ink is adhered to fibers, specifically the ink is adhered to the fibers in the direction along which the fibers extend, that is, in the fiber axis direction is secured, and rub fastness of the image can be improved.

Examples of the hydrophilic treatment include a corona treatment, a plasma treatment, a frame treatment, a heat treatment, an abrasion treatment, a light irradiation treatment (UV treatment) and a flame treatment; however, the hydrophilic treatment is not limited thereto.

For example, when a corona treatment is performed on the surface of the recording base material before recording an image by applying a water-based ink to the surface of the recording base material, the surface energy of the base material can be increased and wetting properties on the surface of the base material and adhesion to the base material can be enhanced. The corona treatment can be performed by using, for example, Corona Master (PS-10S manufactured by Shinko Electric & Instrumentation Co., Ltd.). The conditions of the corona treatment may be appropriately selected depending on circumstances, for example, the type of recording base material and ink composition. For example, the following treatment condition can be used.

Treatment voltage: 10 to 15.6 kV
Treatment speed: 30 to 100 mm/s

The hydrophilic treatment of the present invention is preferably an embodiment in which a corona treatment is performed from the viewpoint of cost and workability.

The surface tension of the recording base material is preferably from $3.4 \times 10^{-6}$ to $4.5 \times 10^{-6}$ J (about from 34 to 45 dyne/cm) and more preferably from $3.5 \times 10^{-6}$ to $4.0 \times 10^{-6}$ J (about from 35 to 40 dyne/cm). When the surface tension of the base material is too small, adhesion of the image decreases, and when the surface tension of the base material is too large, texture of the base material for itself may be deteriorated.

The surface tension of the base material can be determined by the number of the mixture at the time when the base material begins to wet with a wetting tension test mixture (manufacture by Wako Pure Chemical Industries, Ltd.).

In this case, the surface tension of the ink is preferably in the range of from 20 to 40 mN/m. In order to adjust the average length of the ink which adheres to the fiber in the below-mentioned fiber axis direction, the tension can be appropriately selected from the above range. The surface tension of the ink is measured by the Wilhelmy method which employs static surface tension measurement device (for example, TD3 manufactured by IKEDA SCIENTIFIC, Ltd.)

Drying and Fixing Process

In the present invention, a drying and fixing process that dries an ink applied onto a recording base material and fixes it on the base material during applying a water-based ink and/or after applying the water-based ink in the ink applying process, is preferably provided. That is, a recorded matter obtained by the image forming method of the present invention is preferably the one having an ink image which has been subjected to a drying treatment.

With the aid of a drying and fixing process, evaporation of a liquid medium (concretely, water, water-soluble organic solvent) in the ink is accelerated, and a high quality image having reduced image unevenness or bleeding and a recorded matter having an excellent rub fastness can be obtained in a short time. The generation of wrinkle on the recording base material can be prevented, and curl of the recording base material can also be prevented. During drying, fusion of the polymer particle contained in the ink is accelerated due to heat at the time of drying to form a favorable film, whereby rub fastness of the recorded matter is further improved.

The drying temperature at the time of drying is not particularly limited as long as the liquid medium present in the ink can evaporate and a film formation by the polymer particles can be performed; and it is preferably not lower than 40° C. from the viewpoint of the above-mentioned conditions. Among others, the drying temperature is preferably from 40° C. to 150° C. and more preferably from 40° C. to 80° C. When the temperature is not higher than 80° C., deformation of the recording base material can be prevented.

The heating time during drying is not particularly limited as long as the liquid medium in the ink can evaporate and a film formation by polymer particles can be performed, and can be appropriately selected in consideration of the type of liquid medium, the type of polymers, the recording speed or the like.

The drying method is not particularly limited as long as the method is to accelerate volatilization of the liquid medium present in the ink. Examples of the drying method include a method of heating a recording base medium before and after recording, a method of blowing air on a recording base medium after recording and a method of combining the above two methods. Specific examples thereof include forced air heating, radiation heating, conductive heating, high-frequency seasoning, microwave drying and dry air ventilation.

According to the present invention, for example, the following aspects of the invention are provided.

<1> An image forming method including an ink applying process that applies a water-based ink containing at least polymer particles, wax particles having a ratio of from 0.5% by mass to less than 8% by mass with respect to the total amount of the ink, colorant, and water, by an inkjet method (inkjetting), onto a recording base material including an aggregate of a non-absorptive or low-absorptive fiber material.

<2> The image forming method according to the item <1>, wherein the glass-transition temperature (Tg) of the polymer particles is from −58° C. to 69° C., and a ratio of the polymer particles with respect to the total amount of the ink is from 1% by mass to 30% by mass.

<3> The image forming method according to the item <1> or the item <2>, wherein the melting point (Tm) of the wax particles is from 50° C. to 150° C.

<4> The image forming method according to any one of the items <1> to <3>, wherein the water-based ink is applied onto the recording base material with an ink droplet amount of from 60 pl to 120 pl.

<5> The image forming method according to any one of the items <1> to <4>, wherein a fiber diameter of a cross section orthogonal to a direction in which a fiber of the fiber material extends, that is to the fiber axis direction is from 1 μm to 200 μm.

<6> The image forming method according to any one of the items <1> to <5>, wherein the fiber area density of the fiber material is from 1 g/m² to 300 g/m².

<7> The image forming method according to any one of the items <1> to <6>, wherein the polymer particles include polyurethane particles.

<8> The image forming method according to according to the item <7>, wherein the polyurethane particles include polyurethane having a structure represented by the aforementioned Formula (PU-1).

<9> The image forming method according to according to the item <8>, wherein, in Formula (PU-1), the residue of the diol compound represented by $R_2$ is selected from an alkylene group, a polyether group, a polyester group, a polycarbonate group and a polycaprolactone group.

<10> The image forming method according to the item <7>, wherein the polyurethane resin includes an acidic group.

<11> The image forming method according to the item <7>, wherein the glass-transition temperature of the polyurethane particles is from 0° C. to 60° C.

<12> The image forming method according to any one of the items <1> to <6>, wherein the polymer particles are selected from acrylic resin polymers, styrene-butadiene polymers or polyolefin resin polymers.
<13> The image forming method according to any one of the items <1> to <12>, wherein the content of the polymer particles is from 1% by mass to 30% by mass with respect to the total mass of the water-based ink.
<14> The image forming method according to according to any one of the items <1> to <13>, wherein the pigment includes a resin-coated pigment in which at least a portion of a surface of the pigment is covered with a cross-linked polymer in which a water-soluble resin has been cross-linked with a cross-linking agent.
<15> The image forming method according to any one of the items <1> to <14>, wherein the wax particles includes Carnauba wax, paraffin wax, or polyethylene wax.
<16> The image forming method according to any one of the items <1> to <15>, wherein the content of the water is from 10% by mass to 99% by mass with respect to a total mass of the water-based ink.
<17> The image forming method according to any one of the items <1> to <16>, wherein the non-absorptive or the low-absorptive fiber material includes a polyolefin fiber, a polyester fiber, a synthetic fiber, a metal fiber or a glass fiber.
<18> The image forming method according to any one of the items <1> to <17>, wherein the aggregate of the non-absorptive or low-absorptive fiber material includes a nonwoven fabric, a textile or a glass wool.
<19> The image forming method according to any one of the items <1> to <18>, further including, before the application of the water-based ink, subjecting the recording base material to a pretreatment comprising a hydrophilic treatment.
<20> The image forming method according to any one of the items <1> to <19>, further including drying and fixing the water-based ink that has been applied onto the recording base material.

The present invention provides an image forming method in which an image having a good texture such as hand feeling (for example, without hardness and stickiness of an image) and an excellent rub fastness is formed by employing a nonwoven fabric made of a non-ink-absorptive or low-absorptive fiber.

EXAMPLES

Herein, the present invention is concretely explained with reference to the following Examples, but not limited thereto, as long as Examples do not exceed the spirit and scope of the invention.

Example 1

Preparation of Magenta Ink

Synthesis of Polymer Dispersant P-1
In accordance with the scheme below, polymer dispersant P-1 was synthesized in the following manner.

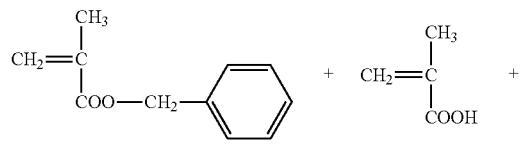

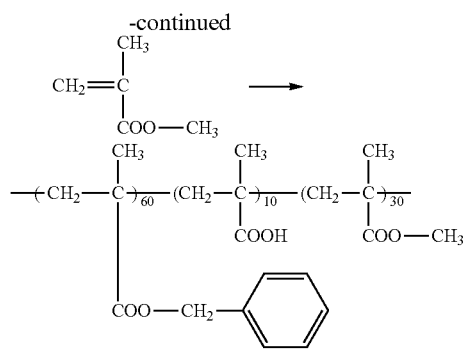

P-1

To a 1000 ml three-neck flask provide with a stirrer and a condenser, 88 g of methyl ethyl ketone was added to be heated under nitrogen atmosphere at 72° C., then a solution in which 0.85 g of dimethyl 2,2'-azobis(isobutyrate), 60 g of benzyl methacrylate, 10 g of methacrylic acid and 30 g of methyl methacrylate were dissolved in 50 g of methyl ethyl ketone was added dropwise thereto over 3 hours. After completion of the dropwise addition, the mixture was allowed to continue a reaction for additional one hour, and then a solution in which 0.42 g of dimethyl 2,2'-azobis(isobutyrate) was dissolved in 2 g of methyl ethyl ketone was added thereto, then the temperature of the mixture was elevated to 78° C. and the mixture was heated for 4 hours. The obtained reaction solution was reprecipitated twice in a large excess amount of hexane, and then the precipitated resin was dried to obtain 96 g of polymer dispersant P-1.

The composition of the obtained polymer dispersant P-1 was confirmed by $^1$H-NMR, and the weight-average molecular weight (Mw) determined by GPC was 44,600. Further, the acid value determined in accordance with JIS standard (JIS K0070:1992) was 65.2 mgKOH/g.

Preparation of Magenta Pigment Dispersion
5 parts of Pigment Red 122 (CROMOPHTAL Jet Magenta DMQ, manufactured by Ciba Specialty Chemicals Co., Ltd.; magenta pigment), 5 parts of the polymer dispersant P-1, 42 parts of methyl ethyl ketone, 5.5 parts of 1N aqueous NaOH solution and 87.2 parts of ion exchanged water were mixed and dispersed by a bead mill using 0.1 mmφ zirconia beads for from 2 to 6 hours.

Methyl ethyl ketone was removed from the obtained dispersion at 55° C. under reduced pressure, and a part of water was further removed therefrom. The mixture was then centrifuged at 8000 rpm for 30 minutes by using High Speed Refrigerated Centrifuge 7550 (manufactured by KUBOTA CORPORATION) and 50 mL centrifuge tube. At this point, supernatant fluids other than the precipitate were recovered. Then, a pigment concentration was determined from absorbance spectrum. Dispersion (magenta pigment dispersion) of resin-coated pigment particle (pigment coated with a polymer dispersant) having 15% by mass of pigment concentration was obtained.

Preparation of Magenta Ink
The ingredients having the following composition were mixed to prepare an ink composition A. After preparation, this ink composition A was packaged in a disposable syringe made of plastic, filtrated by a filter (Millex-SV manufactured by Millipore Corporation, diameter 25 mm) having a pore diameter of 5 μm made of poly(vinylidene fluoride) (PVDF), to obtain a magenta ink.

Composition of Ink Composition A

Magenta pigment dispersion liquid (pigment concentration: 15% by mass) ... 26.7 parts by mass 2-pyrrolidone (manufactured by Tokyo Chemical Industry Co., Ltd.) ... 17 parts by mass 2-methyl-1,3-propanediol ... 9 parts by mass OLFINE E1010 (manufactured by Nissin Chemical Industry Co., Ltd) ... 1 parts by mass ACRIT WBR-016U ... 16.7 parts by mass (manufactured by Taisei Fine Chemical Co., Ltd., 30% by mass dispersion liquid of polyurethane resin particle (Tg: 20° C., volume-average particle size: about 30 nm))

SEROZOL 524 ... 6.7 parts by mass (manufactured by Chukyo Yushi Co., Ltd., 30% by mass dispersion liquid of Carnauba wax particle (Tm: 83° C., volume-average particle size: about 80 μm))

Ion exchanged water ... remaining amount (parts by mass) required to make the total amount 100 parts by mass Image Recording and Evaluation 1. Image Recording Polypropylene nonwoven fabric (fiber area density: 30 g/m², thickness: 13 μm, fiber size: 20 μm) was subjected to a corona treatment four times by using Corona Master (PS-10S manufactured by Shinko Electric & Instrumentation Co., Ltd.) under the conditions of treatment voltage: 15.6 kV and treatment speed: 50 mm/s. On the nonwoven fabric which was subjected to the corona treatment, a 100% solid image was recorded by using GELJET GX-5000 print head and applying 2.4 pL of the magenta ink prepared in the above-mentioned manner. This solid image was adhered to a hot plate heated at the temperature of 60° C., then a warm air having the temperature of 50° C. was blown at a velocity of the wind of 7 m/s for 30 seconds from the non-image forming side, to perform a drying and fixing operation, thereby obtaining an image sample.

2. Measurement and Evaluation

For the thus obtained image sample, the following measurement and evaluation were performed. The results of the measurement and the evaluation are shown in Table 1 below.

Rub Fastness

For the image portion of the obtained image sample, Gakushin-Type Rubbing Tester (manufactured by Yasuda Seiki seisakusho, Ltd., No. 428) was used and the image portion was rubbed for a prescribed numbers of reciprocating motion while applying a force of about 2N with a white cotton to visually inspect the migrated color, and evaluation was performed in accordance with the following evaluation criteria.

Evaluation Criteria

A: After 7 reciprocating rubbings, color migration to white cotton is scarcely observed, and there is no problem in practical use.

B: After 7 reciprocating rubbings, a slight color migration to white cotton is observed, but there is no problem in practical use.

C: After 7 reciprocating rubbings, color migration to white cotton is observed, but after 3 reciprocating rubbings, color migration to white cotton is scarcely observed and there is no problem in practical use.

D: After 3 reciprocating rubbings, color migration to white cotton is observed, which is problematic in practical use.

E: After 3 reciprocating rubbings, a clear color migration to white cotton is observed.

C. Texture of Image

For the image portion of the obtained image sample, evaluation was performed in accordance with examination by touch and the following evaluation criteria.

Evaluation Criteria

A: hardness and stickiness are not felt or faintly felt on the image but there is no problem in practical use B: hardness or stickiness is slightly felt on the image but there is no problem in practical use C: hardness or stickiness is clearly felt on the image, which is problematic in practical use Example 2

A solid image was recorded and an image sample was produced and evaluated in the same manner as Example 1, except that GX-5000 print head was replaced with DMP head (manufactured by FUJIFILM Dimatix, Inc., DMP-2800); and the amount of ink droplet was changed from 2.4 pL to 10 pL so that the same amount of ink as Example 1 was spotted. The results of measurement and evaluation are shown in Table 1 below.

Example 3

A solid image was recorded and an image sample was produced and evaluated in the same manner as in Example 1, except that GX-5000 print head was replaced with Q-Class print head (manufactured by FUJIFILM Dimatix, Inc., Q-Class); and the amount of ink droplet was changed from 2.4 pL to 60 pL so that the same amount of ink as Example 1 was spotted. The results of measurement and evaluation are shown in Table 1 below.

Example 4

A solid image was recorded and an image sample was produced and evaluated in the same manner as Example 1, except that GX-5000 print head was replaced with Q-Class print head (manufactured by FUJIFILM Dimatix, Inc., Q-Class); and the amount of ink droplet was changed from 2.4 pL to 85 pL so that the same amount of ink as Example 1 was spotted. In this case, the surface tension of nonwoven fabric (recording base material) is 4.0×10-6 (40 dyne/cm), the surface tension of the ink is 38 mN/m, and the diameter of ink droplet provided on nonwoven fabric (diameter before the impact) is 54.4 nm. The results of measurement and evaluation are shown in Table 1 below.

The surface tension of nonwoven fabric (recording base material) was determined by the number of the mixture at the time when the base material began to wet with a wetting tension test mixture (manufacture by Wako Pure Chemical Industries, Ltd.).

The surface tension of the ink was measured in accordance with the Wilhelmy method using a static surface tension measurement device (TD3 manufactured by IKEDA SCIENTIFIC, Ltd.).

Example 5

A solid image was recorded and an image sample was produced and evaluated in the same manner in Example 1, except that the nonwoven fabric which was not subjected to the corona treatment, GX-5000 print head was replaced with Q-Class print head (manufactured by FUJIFILM Dimatix, Inc., Q-Class); and the amount of ink droplet was changed from 2.4 pL to 85 pL so that the same amount of ink as Example 1 was spotted. The results of measurement and evaluation are shown in Table 1 below.

Example 6

A solid image was recorded and an image sample was produced and evaluated in the same manner as Example 1, except that GX-5000 print head was replaced with Q-Class print head (manufactured by FUJIFILM Dimatix, Inc., Q-Class); the amount of ink droplet was changed from 2.4 pL to 85 pL so that the same amount of ink as Example 1 was spotted; and that the drying and fixing operation was not performed. The results of measurement and evaluation are shown in Table 1 below.

Example 7

A solid image was recorded and an image sample was produced and evaluated in the same manner as in Example 1 except that GX-5000 print head was replaced with Q-Class print head (manufactured by FUJIFILM Dimatix, Inc., Q-Class); ink composition A was replaced with ink composition B having the composition below; the amount of ink droplet was changed from 2.4 pL to 85 pL so that the same amount of ink as Example 1 was spotted. The results of measurement and evaluation are shown in Table 1 below.

The ink composition B was prepared in the same manner as the ink composition A except that the composition was changed to the following composition.

Composition of Ink Composition B
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass
- OLFINE E1010 (manufactured by Nissin Chemical Industry Co., Ltd) . . . 1 part by mass
- CHEMIPEARL S-75N . . . 20.8 parts by mass (manufactured by Mitsui Chemicals, Inc., 24% by mass dispersion liquid of ethylene ionomer resin fine particles (Tg: 30° C., volume-average particle size: about 20 nm))
- SEROZOL 524 . . . 6.7 parts by mass (manufactured by Chukyo Yushi Co., Ltd., 30% by mass dispersion liquid of Carnauba wax particle (Tm: 83° C., volume-average particle size: about 80 μm))
- Ion exchanged water . . . remaining amount (parts by mass) required to make the total amount 100 parts by mass Example 8

A solid image was recorded and an image sample was produced and evaluated in the same manner as Example 1, except that GX-5000 print head was replaced with Q-Class print head (manufactured by FUJIFILM Dimatix, Inc., Q-Class); ink composition A was replaced with ink composition C having the composition below; and the amount of ink droplet was changed from 2.4 pL to 85 pL so that the same amount of ink as Example 1 was spotted. The results of measurement and evaluation are shown in Table 1 below.

The ink composition C was prepared in the same manner as the ink composition A, except that the composition was changed to the following composition.

Composition of Ink Composition C
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-methyl-1,3-propanediol . . . 9 parts by mass
- OLFINE E1010 (manufactured by Nissin Chemical Industry Co., Ltd.) . . . 1 part by mass
- ARON HD-5 . . . 16.7 parts by mass (manufactured by TOAGOSEI CO., LTD., 30% by mass dispersion liquid of acrylic resin fine particle (Tg: 45° C., volume-average particle size: about 20 nm))
- SEROZOL 524 . . . 6.7 parts by mass (manufactured by Chukyo Yushi Co., Ltd., 30% by mass dispersion liquid of Carnauba wax particle (Tm: 83° C., volume-average particle size: about 80 μm))
- Ion exchanged water . . . remaining amount (parts by mass) required to make the total amount 100 parts by mass Example 9

A solid image was recorded and an image sample was produced and evaluated in the same manner as Example 1, except that GX-5000 print head was replaced with Q-Class print head (manufactured by FUJIFILM Dimatix, Inc., Q-Class); ink composition A is replaced with ink composition D having the composition below; and the amount of ink droplet was changed from 2.4 pL to 85 pL so that the same amount of ink as Example 1 was spotted. The results of measurement and evaluation are shown in Table 1 below.

The ink composition D was prepared in the same was as the ink composition A except that the composition was changed to the composition below.

Composition of Ink Composition D
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass OLFINE E1010 (manufactured by Nissin Chemical Industry Co., Ltd.) . . . 1 part by mass
- JONCRYL 538 . . . 11.1 parts by mass (manufactured by TOAGOSEI CO., LTD., 45% by mass dispersion liquid of styrene/acrylic resin fine particle (Tg: 66° C., volume-average particle size: about 90 nm))
- SEROZOL 524 . . . 6.7 parts by mass (manufactured by Chukyo Yushi Co., Ltd., 30% by mass dispersion liquid of Carnauba wax particle (Tm: 83° C., volume-average particle size: about 80 μm))
- Ion exchanged water . . . remaining amount (parts by mass) required to make the total amount 100 parts by mass Example 10

A solid image was recorded and an image sample was produced and evaluated in the same manner as Example 1, except that GX-5000 print head was replaced with Q-Class print head (manufactured by FUJIFILM Dimatix, Inc., Q-Class); ink composition A was replaced with ink composition E having the composition below; and the amount of ink droplet was changed from 2.4 pL to 85 pL so that the same amount of ink as Example 1 was spotted. The results of measurement and evaluation are shown in Table 1 below.

The ink composition E was prepared in the same manner as the ink composition A, except that the composition was changed to the following composition.

Composition of Ink Composition E
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass
- OLFINE E1010 (manufactured by Nissin Chemical Industry Co., Ltd) . . . 1 part by mass
- ACRIT WBR-016U . . . 16.7 parts by mass (manufactured by Taisei Fine Chemical Co., Ltd., 30% by mass dispersion liquid of polyurethane resin particle (Tg: 20° C., volume-average particle size: about 30 nm))

SEROZOL 524 ... 13.3 parts by mass (manufactured by Chukyo Yushi Co., Ltd., 30% by mass dispersion liquid of Carnauba wax particle (Tm: 83° C., volume-average particle size: about 80 μm))

Ion exchanged water ... remaining amount (parts by mass) required to make the total amount 100 parts by mass Example 11

A solid image was recorded and an image sample was produced and evaluated in the same manner as Example 1, except that GX-5000 print head was replaced with Q-Class print head (manufactured by FUJIFILM Dimatix, Inc., Q-Class); ink composition A was replaced with ink composition F having the composition below; and the amount of ink droplet was changed from 2.4 pL to 85 pL so that the same amount of ink as Example 1 was spotted. The results of measurement and evaluation are shown in Table 1 below.

The ink composition F was prepared in the same manner as the ink composition A, except that the composition was changed to the following composition.

Composition of Ink Composition F

Magenta pigment dispersion liquid (pigment concentration: 15% by mass) ... 26.7 parts by mass 2-Pyrrolidone (manufactured by Tokyo Chemical Industry Co., Ltd.) ... 17 parts by mass 2-Methyl-1,3-propanediol ... 9 parts by mass OLFINE E1010 (manufactured by Nissin Chemical Industry Co., Ltd.) ... 1 part by mass ACRIT WBR-016U ... 16.7 parts by mass (manufactured by Taisei Fine Chemical Co., Ltd., 30% by mass dispersion liquid of polyurethane resin particle (Tg: 20° C., volume-average particle size: about 30 nm))

SEROZOL 524 ... 23.3 parts by mass (manufactured by Chukyo Yushi Co., Ltd., 30% by mass dispersion liquid of Carnauba wax particle (Tm: 83° C., volume-average particle size: about 80 μm))

Ion exchanged water ... remaining amount (parts by mass) required to make the total amount 100 parts by mass Example 12

A solid image was recorded and an image sample was produced and evaluated in the same manner as Example 1, except that GX-5000 print head was replaced with Q-Class print head (manufactured by FUJIFILM Dimatix, Inc., Q-Class); ink composition A was replaced with ink composition G having the composition below; and the amount of ink droplet was changed from 2.4 pL to 85 pL so that the same amount of ink as Example 1 was spotted. The results of measurement and evaluation are shown in Table 1 below.

The ink composition G was prepared in the same manner as the ink composition A, except that the composition was changed to the following composition.

Composition of Ink Composition G

Magenta pigment dispersion liquid (pigment concentration: 15% by mass) ... 26.7 parts by mass 2-Pyrrolidone (manufactured by Tokyo Chemical Industry Co., Ltd.) ... 17 parts by mass 2-Methyl-1,3-propanediol ... 9 parts by mass OLFINE E1010 (manufactured by Nissin Chemical Industry Co., Ltd.) ... 1 part by mass ARROWBASE SB-1010 ... 20.0 parts by mass (manufactured by Unitika Co., Ltd., 25% by mass dispersion liquid of modified polyolefin fine particles (Tg: 80° C.))

SEROZOL 524 ... 6.7 parts by mass (manufactured by Chukyo Yushi Co., Ltd., 30% by mass dispersion liquid of Carnauba wax particle (Tm: 83° C., volume-average particle size: about 80 μm))

Ion exchanged water ... remaining amount (parts by mass) required to make the total amount 100 parts by mass Example 13

A solid image was recorded and an image sample was produced and evaluated in the same manner as Example 1, except that GX-5000 print head was replaced with Q-Class print head (manufactured by FUJIFILM Dimatix, Inc., Q-Class); ink composition A was replaced with ink composition H having the composition below; and the amount of ink droplet was changed from 2.4 pL to 85 pL so that the same amount of ink as Example 1 was spotted. The results of measurement and evaluation are shown in Table 1 below.

The ink composition H was prepared in the same manner as the ink composition A, except that the composition was changed to the following composition.

Composition of Ink Composition H

Magenta pigment dispersion liquid (pigment concentration: 15% by mass) ... 26.7 parts by mass 2-Pyrrolidone (manufactured by Tokyo Chemical Industry Co., Ltd.) ... 17 parts by mass 2-Methyl-1,3-propanediol ... 9 parts by mass OLFINE E1010 (manufactured by Nissin Chemical Industry Co., Ltd.) ... 1 part by mass JONCRYL 741 ... 10.2 parts by weight (manufactured by TOAGOSEI CO., LTD., 49% by mass dispersion liquid of styrene/acrylic resin particle (Tg: 15° C., volume-average particle size: about 80 nm))

SEROZOL 524 ... 6.7 parts by mass (manufactured by Chukyo Yushi Co., Ltd., 30% by mass dispersion liquid of Carnauba wax particle (Tm: 83° C., volume-average particle size: about 80 μm))

Ion exchanged water ... remaining amount (parts by mass) required to make the total amount 100 parts by mass Example 14

A solid image was recorded and image sample was produced and evaluated in the same manner as Example 1, except that GX-5000 print head was replaced with Q-Class print head (manufactured by FUJIFILM Dimatix, Inc., Q-Class); ink composition A was replaced with ink composition I having the composition below; and the amount of ink droplet was changed from 2.4 pL to 85 pL so that the same amount of ink as Example 1 was spotted. The results of measurement and evaluation are shown in Table 1 below.

The ink composition I was prepared in the same manner as the ink composition A, except that the composition was changed to the following composition.

Composition of Ink Composition I

Magenta pigment dispersion liquid (pigment concentration: 15% by mass) ... 26.7 parts by mass 2-Pyrrolidone (manufactured by Tokyo Chemical Industry Co., Ltd.) ... 17 parts by mass 2-Methyl-1,3-propanediol ... 9 parts by mass OLFINE E1010 (manufactured by Nissin Chemical Industry Co., Ltd.) ... 1 part by mass SR-103 ... 10.4 parts by mass (manufactured by Nippon A&L Inc., 48% by mass dispersion liquid of styrene/butadiene resin fine particle (Tg: 5° C., volume-average particle size: about 220 nm))

SEROZOL 524 ... 6.7 parts by mass (manufactured by Chukyo Yushi Co., Ltd., 30% by mass dispersion liquid of Carnauva wax particle (Tm: 83° C., volume-average particle size: about 80 μm))

Ion exchanged water . . . remaining amount (parts by mass) required to make the total amount 100 parts by mass Example 15

A solid image was recorded and an image sample was produced and evaluated in the same manner as Example 1, except that GX-5000 print head was replaced with Q-Class print head (manufactured by FUJIFILM Dimatix, Inc., Q-Class); ink composition A was replaced with ink composition J having the composition below; and the amount of ink droplet was changed from 2.4 pL to 85 pL so that the same amount of ink as Example 1 was spouted. The results of measurement and evaluation are shown in Table 1 below.

The ink composition J was prepared in the same manner as the ink composition A, except that the composition was changed to the following composition.

Composition of Ink Composition J
Magenta pigment dispersion liquid (pigment concentration: 15% by mass) . . . 26.7 parts by mass
2-Pyrrolidone (manufactured by Tokyo Chemical Industry Co., Ltd.) . . . 17 parts by mass
2-Methyl-1,3-propanediol . . . 9 parts by mass
OLFINE E1010 (manufactured by Nissin Chemical Industry Co., Ltd) . . . 1 part by mass
WBR-600U . . . 14.7 parts by mass (manufactured by Taisei Fine Chemical Co., Ltd., 34% by mass dispersion liquid of polyurethane resin fine particle (Tg: −30° C.))
SEROZOL 524 . . . 6.7 parts by mass (manufactured by Chukyo Yushi Co., Ltd., 30% by mass dispersion liquid of Carnauba wax particle (Tm: 83° C., volume-average particle size: about 80 μm))
Ion exchanged water . . . remaining amount (parts by mass) required to make the total amount 100 parts by mass Example 16

A solid image was recorded and an image sample was produced and evaluated in the same manner as Example 1, except that GX-5000 print head was replaced with Q-Class print head (manufactured by FUJIFILM Dimatix, Inc., Q-Class); ink composition A was replaced with ink composition K having the composition below; and the amount of ink droplet was changed from 2.4 pL to 85 pL so that the same amount of ink as Example 1 was spotted. The results of measurement and evaluation are shown in Table 1 below.

The ink composition K was prepared in the same manner as the ink composition A, except that the composition was changed to the following composition.

Composition of Ink Composition K
Magenta pigment dispersion liquid (pigment concentration: 15% by mass) . . . 26.7 parts by mass
2-Pyrrolidone (manufactured by Tokyo Chemical Industry Co., Ltd.) . . . 17 parts by mass
2-Methyl-1,3-propanediol . . . 9 parts by mass
OLFINE E1010 (manufactured by Nissin Chemical Industry Co., Ltd.) . . . 1 part by mass
ACRIT WBR-016U . . . 16.7 parts by mass (manufactured by Taisei Fine Chemical Co., Ltd., 40% by mass dispersion liquid of polyurethane resin particle (Tg: 20° C., volume-average particle size: about 30 nm))
TRASOL PF60 . . . 6.7 parts by mass (manufactured by Chukyo Yushi Co., Ltd., 40% by mass dispersion liquid of paraffin wax fine particle (Tm: 66° C., volume-average particle size: about 500 μm))
Ion exchanged water . . . remaining amount (parts by mass) required to make the total amount 100 parts by mass Example 17

A solid image was recorded and an image sample was produced and evaluated in the same manner as Example 1, except that GX-5000 printhead was replaced with Q-Class print head (manufactured by FUJIFILM Dimatix, Inc., Q-Class); ink composition A was replaced with ink composition L having the composition below; and the amount of ink droplet was changed from 2.4 pL to 85 pL so that the same amount of ink as Example 1 was spotted. The results of measurement and evaluation are shown in Table 1 below.

The ink composition L was prepared in the same manner as the ink composition A, except that the composition was changed to the following composition.

Composition of Ink Composition L
Magenta pigment dispersion liquid (pigment concentration: 15% by mass) . . . 26.7 parts by mass
2-Pyrrolidone (manufactured by Tokyo Chemical Industry Co., Ltd.) . . . 17 parts by mass
2-Methyl-1,3-propanediol . . . 9 parts by mass
OLFINE E1010 (manufactured by Nissin Chemical Industry Co., Ltd.) . . . 1 part by mass
ACRIT WBR-016U . . . 16.7 parts by mass (manufactured by Taisei Fine Chemical Co., Ltd., 30% by mass dispersion liquid of polyurethane resin particle (Tg: 20° C., volume-average particle size: about 30 nm))
POLYLON O-255 . . . 6.7 parts by mass (manufactured by Chukyo Yushi Co., Ltd., 30% by mass dispersion liquid of paraffin wax fine particle (Tm: 138° C., volume-average particle size: about 80 μm))
Ion exchanged water . . . remaining amount (parts by mass) required to make the total amount 100 parts by mass Example 18

A solid image was recorded and an image sample was produced and evaluated in the same manner as Example 1, except that GX-5000 print head was replaced with Q-Class print head (manufactured by FUJIFILM Dimatix, Inc., Q-Class); and the amount of ink droplet was changed from 2.4 pL to 120 pL so that the same amount of ink as Example 1 was spotted. The results of measurement and evaluation are shown in Table 1 below.

Example 19

A solid image was recorded and an image sample was produced and evaluated in the same manner as Example 1, except that GX-5000 print head was replaced with Q-Class print head (manufactured by FUJIFILM Dimatix, Inc., Q-Class); and the amount of ink droplet was changed from 2.4 pL to 150 pL so that the same amount of ink as Example 1 was spotted. The results of measurement and evaluation are shown in Table 1 below.

Example 20

A solid image was recorded and an image sample was prepared and evaluated in the same manner as Example 4, except that the ink of Example 4 was changed to the following ink. The results of measurement and evaluation are shown in Table 1 below.

Composition of Ink Composition Q
- Projet Magenta APD 1000 (FUJIFILM Imaging Colorants Ltd, Magenta pigment dispersion liquid, pigment concentration: 14% by mass, cross-linking type dispersant) . . . 28.57 parts by mass
- 2-Pyrrolidone (manufactured by Tokyo Chemical Industry Co., Ltd.) . . . 26 parts by mass
- 2-Methyl-1,3-propanediol . . . 13.9 parts by mass
- OLFINE E1010 (manufactured by Nissin Chemical Industry Co., Ltd) . . . 1 part by mass
- WBR-016U . . . 16.7 parts by mass (manufactured by Taisei Fine Chemical Co., Ltd., 30% by mass dispersion liquid of polyurethane resin particle (Tg: 20° C., volume-average particle size: about 20 nm))
- SEROZOL 524 . . . 30.0 parts by mass (manufactured by Chukyo Yushi Co., Ltd., 30% by mass dispersion liquid of Carnauba wax particle (Tm: 83° C., volume-average particle size: about 80 µm))
- Ion exchanged water . . . remaining amount (parts by mass) required to make the total amount 100 parts by mass Example 21

A solid image was recorded and an image sample was prepared and evaluated in the same manner as Example 4, except that the ink of Example 4 was changed to the following ink. The results of measurement and evaluation are shown in Table 1 below.

Composition of Ink Composition R
- Projet Magenta APD 1000 (FUJIFILM Imaging Colorants Ltd, Magenta pigment dispersion liquid, pigment concentration: 14% by mass, cross-linking type dispersant) . . . 28.57 parts by mass
- 2-Pyrrolidone (manufactured by Tokyo Chemical Industry Co., Ltd.) . . . 26 parts by mass
- 2-Methyl-1,3-propanediol . . . 13.9 parts by mass
- OLFINE E1010 (manufactured by Nissin Chemical Industry Co., Ltd) . . . 1 part by mass
- IMPRANIL DLP-R . . . 10 parts by mass (manufactured by SUMIKA BAYER URETHANE CO., LTD, 50% by mass dispersion liquid of polyurethane resin particle (Tg 21° C., volume-average particle size: about 220 nm))
- SEROZOL 524 . . . 30.0 parts by mass (manufactured by Chukyo Yushi Co., Ltd., 30% by mass dispersion liquid of Carnauba wax particle (Tm: 83° C., volume-average particle size: about 80 µm))
- Ion exchanged water . . . remaining amount (parts by mass) required to make the total amount 100 parts by mass Example 22

A solid image was recorded and an image sample was prepared and evaluated in the same manner as Example 4, except that the ink of Example 4 was changed to the following ink. The results of measurement and evaluation are shown in Table 1 below.

Composition of Ink Composition S
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass
- OLFINE E1010 (manufactured by Nissin Chemical Industry Co., Ltd) . . . 1 part by mass
- WBR-016U . . . 16.7 parts by mass (manufactured by Taisei Fine Chemical Co., Ltd., 30% by mass dispersion liquid of polyurethane resin fine particle (Tg: 20° C., volume-average particle size: about 20 nm))
- SEROZOL 524 . . . 3.3 parts by mass (manufactured by Chukyo Yushi Co., Ltd., 30% by mass dispersion liquid of Carnauba wax particle (Tm: 83° C., volume-average particle size: about 80 µm))
- Ion exchanged water . . . remaining amount (parts by mass) required to make the total amount 100 parts by mass Example 23

A solid image was recorded and an image sample was prepared and evaluated in the same manner as Example 4, except that the ink of Example 4 was changed to the following ink. The results of measurement and evaluation are shown in Table 1 below.

Composition of Ink Composition T
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass
- OLFINE E1010 (manufactured by Nissin Chemical Industry Co., Ltd) . . . 1 part by mass
- WBR-016U . . . 16.7 parts by mass (manufactured by Taisei Fine Chemical Co., Ltd., 30% by mass dispersion liquid of polyurethane resin fine particle (Tg: 20° C., volume-average particle size: about 20 nm))
- SEROZOL 524 . . . 20.0 parts by mass (manufactured by Chukyo Yushi Co., Ltd., 30% by mass dispersion liquid of Carnauba wax particle (Tm: 83° C., volume-average particle size: about 80 µm))
- Ion exchanged water . . . remaining amount (parts by mass) required to make the total amount 100 parts by mass Example 24

A solid image was recorded and an image sample was prepared and evaluated in the same manner as Example 4, except that the ink of Example 4 was changed to the following ink. The results of measurement and evaluation are shown in Table 1 below.

Composition of Ink Composition U
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass
- OLFINE E1010 (manufactured by Nissin Chemical Industry Co., Ltd) . . . 1 part by mass
- DESPACOL U-53 . . . 12.5 parts by mass (manufactured by SUMIKA BAYER URETHANE CO., LTD., 40% by mass dispersion liquid of polyurethane resin fine particle (Tg: −58° C., volume-average particle size: about 150 nm))
- SEROZOL 524 . . . 6.7 parts by mass (manufactured by Chukyo Yushi Co., Ltd., 30% by mass dispersion liquid of Carnauba wax particle (Tm: 83° C., volume-average particle size: about 80 µm))
- Ion exchanged water . . . remaining amount (parts by mass) required to make the total amount 100 parts by mass Example 25

A solid image was recorded and an image sample was prepared and evaluated in the same manner as Example 4, except that the ink of Example 4 was changed to the following ink. The results of measurement and evaluation are shown in Table 1 below.

Composition of Ink Composition V
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass
- OLFINE E1010 (manufactured by Nissin Chemical Industry Co., Ltd) . . . 1 part by mass
- UW-5101-E . . . 16.7 parts by mass (manufactured by Ube Industries, Ltd., 30% by mass dispersion liquid of polyurethane resin fine particle (Tg: 69° C., volume-average particle size: about 35 nm))
- SEROZOL 524 . . . 6.7 parts by mass (manufactured by Chukyo Yushi Co., Ltd., 30% by mass dispersion liquid of Carnauba wax particle (Tm: 83° C., volume-average particle size: about 80 μm))
- Ion exchanged water . . . remaining amount (parts by mass) required to make the total amount 100 parts by mass Comparative Example 1

A solid image was recorded and an image sample was produced and evaluated in the same manner as Example 1, except that the nonwoven fabric which was not subjected to the corona treatment and the drying and fixing operation was not performed; GX-5000 print head was replaced with Q-Class print head (manufactured by FUJIFILM Dimatix, Inc., Q-Class); ink composition A is replaced with ink composition M having the composition below; and the amount of ink droplet was changed from 2.4 pL to 85 pL so that the same amount of ink as Example 1 was spotted. The results of measurement and evaluation are shown in Table 1 below.

The ink composition M was prepared in the same manner as the ink composition A, except that the composition was changed to the following composition.

Composition of Ink Composition M
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass
- OLFINE E1010 (manufactured by Nissin Chemical Industry Co., Ltd.) . . . 1 part by mass
- WBR-016U . . . 14.7 parts by mass (manufactured by Taisei Fine Chemical Co., Ltd., 30% by mass dispersion liquid of polyurethane resin fine particle (Tg: 20° C., volume-average particle size: about 30 nm))
- Ion exchanged water . . . remaining amount (parts by mass) required to make the total amount 100 parts by mass Comparative Example 2

A solid image was recorded and an image sample was produced and evaluated in the same manner as Comparative Example 1, except that the nonwoven fabric was subjected to the corona treatment. The results of measurement and evaluation are shown in Table 1 below.

Comparative Example 3

A solid image was recorded and an image sample was produced and evaluated in the same manner as Example 1, except that GX-5000 print head was replaced with Q-Class print head (manufactured by FUJIFILM Dimatix, Inc., Q-Class); ink composition A is replaced with the above ink composition M; and the amount of ink droplet was changed from 2.4 pL to 85 pL so that the same amount of ink as Example 1 was spotted. The results of measurement and evaluation are shown in Table 1 below.

Comparative Example 4

A solid image was recorded and an image sample was produced and evaluated in the same manner as Example 1, except that GX-5000 print head was replaced with Q-Class print head (manufactured by FUJIFILM Dimatix, Inc., Q-Class); and ink composition A was replaced with ink composition N having the composition below; and the amount of ink droplet was changed from 2.4 pL to 85 pL so that the same amount of ink as Example 1 was spotted. The results of measurement and evaluation are shown in Table 1 below.

The ink composition N was prepared in the same manner as the ink composition A, except that the composition was changed to the following composition.

Composition of Ink Composition N
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass
- OLFINE E1010 (manufactured by Nissin Chemical Industry Co., Ltd.) . . . 1 part by mass
- SEROZOL 524 . . . 6.7 parts by mass (manufactured by Chukyo Yushi Co., Ltd., 30% by mass dispersion liquid of Carnauva wax fine particle (Tm: 83° C., volume-average particle size: about 80 nm))
- Ion exchanged water . . . remaining amount (parts by mass) required to make the total amount 100 parts by mass Comparative Example 5

A solid image was recorded and an image sample was produced and evaluated in the same manner as Example 1, except that GX-5000 print head was replaced with Q-Class print head (manufactured by FUJIFILM Dimatix, Inc., Q-Class); ink composition A was replaced with ink composition O having the composition below; and the amount of ink droplet was changed from 2.4 pL to 85 pL so that the same amount of ink as Example 1 was spotted. The results of measurement and evaluation are shown in Table 1 below.

The ink composition O was prepared in the same manner as the ink composition A, except that the composition was changed to the following composition.

Composition of Ink Composition O
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass
- OLFINE E1010 (manufactured by Nissin Chemical Industry Co., Ltd.) . . . 1 part by mass
- Ion exchanged water . . . remaining amount (parts by mass) required to make the total amount 100 parts by mass Comparative Example 6

A solid image was recorded and an image sample was produced and evaluated in the same manner as Example 1, except that GX-5000 print head was replaced with Q-Class print head (manufactured by FUJIFILM Dimatix, Inc., Q-Class); ink composition A was replaced with ink composition P having the composition below; and the amount of ink droplet was changed from 2.4 pL to 85 pL so that the same amount of ink as Example 1 was spotted. The results of measurement and evaluation are shown in Table 1 below.

The ink composition P was prepared in the same manner as the ink composition A, except that the composition was changed to the following composition.

Composition of Ink Composition P
- Magenta pigment dispersion liquid (pigment concentration: 15% by mass) . . . 26.7 parts by mass
- 2-pyrrolidone (manufactured by Tokyo Chemical Industry Co., Ltd.) . . . 17 parts by mass
- 2-methyl-1,3-propanediol . . . 9 parts by mass
- OLFINE E1010 (manufactured by Nissin Chemical Industry Co., Ltd.) . . . 1 part by mass
- WBR-016U . . . 16.7 parts by mass (manufactured by Taisei Fine Chemical Co., Ltd., 30% by mass dispersion liquid of polyurethane resin particle (Tg: 20° C., volume-average particle size: about 20 nm))
- SEROZOL 524 . . . 30.0 parts by mass (manufactured by Chukyo Yushi Co., Ltd., 30% by mass dispersion liquid of Carnauva wax particle (Tm: 83° C., volume-average particle size: about 80 μm))
- Ion exchanged water . . . remaining amount (parts by mass) required to make the total amount 100 parts by mass Comparative Example 7

A solid image was recorded and an image sample was prepared and evaluated in the same manner as Example 6, except that the ink of Example 6 was changed to the following ink. The results of measurement and evaluation are shown in Table 1 below.

Composition of Ink Composition W
- Magenta pigment dispersion liquid (pigment concentration: 15% by mass) . . . 26.7 parts by mass
- 2-Pyrrolidone (manufactured by Tokyo Chemical Industry Co., Ltd.) . . . 17 parts by mass
- 2-Methyl-1,3-propanediol . . . 9 parts by mass
- OLFINE E1010 (manufactured by Nissin Chemical Industry Co., Ltd) . . . 1 part by mass
- WBR-016U . . . 16.7 parts by mass (manufactured by Taisei Fine Chemical Co., Ltd., 30% by mass dispersion liquid of polyurethane resin fine particle (Tg: 20° C., volume-average particle size: about 20 nm))
- SEROZOL 524 . . . 26.7 parts by mass (manufactured by Chukyo Yushi Co., Ltd., 30% by mass dispersion liquid of Carnauba wax particle (Tm: 83° C., volume-average particle size: about 80 μm))
- Ion exchanged water . . . remaining amount (parts by mass) required to make the total amount 100 parts by mass

TABLE 1

| | | Polymer | Wax Particle | | Amount of | | | Evaluation | |
|---|---|---|---|---|---|---|---|---|---|
| | Type of Ink | Particle Tg (° C.) | Melting Point Tm (° C.) | Content % by mass | Ink Droplet (pl) | Corona Treatment | Drying and Fixing Process | Rub Fsatness | Texture |
| Example 1 | A | 20 | 83 | 2 | 2.4 | Applied | Applied | B | A |
| Example 2 | A | 20 | 83 | 2 | 10 | Applied | Applied | B | A |
| Example 3 | A | 20 | 83 | 2 | 60 | Applied | Applied | A | A |
| Example 4 | A | 20 | 83 | 2 | 85 | Applied | Applied | A | A |
| Example 5 | A | 20 | 83 | 2 | 85 | Not Applied | Applied | B | B |
| Example 6 | A | 20 | 83 | 2 | 85 | Applied | Not Applied | A | B |
| Example 7 | B | 30 | 83 | 2 | 85 | Applied | Applied | A | A |
| Example 8 | C | 45 | 83 | 2 | 85 | Applied | Applied | A | A |
| Example 9 | D | 66 | 83 | 2 | 85 | Applied | Applied | B | B |
| Example 10 | E | 20 | 83 | 4 | 85 | Applied | Applied | A | A |
| Example 11 | F | 20 | 83 | 7 | 85 | Applied | Applied | A | B |
| Example 12 | G | 80 | 83 | 2 | 85 | Applied | Applied | B | B |
| Example 13 | H | 15 | 83 | 2 | 85 | Applied | Applied | A | A |
| Example 14 | I | 5 | 83 | 2 | 85 | Applied | Applied | B | B |
| Example 15 | J | -30 | 83 | 2 | 85 | Applied | Applied | C | B |
| Example 16 | K | 20 | 66 | 2 | 85 | Applied | Applied | A | A |
| Example 17 | L | 20 | 138 | 2 | 85 | Applied | Applied | A | A |
| Example 18 | A | 20 | 83 | 2 | 120 | Applied | Applied | A | B |
| Example 19 | A | 20 | 83 | 2 | 150 | Applied | Applied | A | B |
| Example 20 | Q | 20 | 83 | 2 | 85 | Applied | Applied | A | A |
| Example 21 | R | 21 | 83 | 2 | 85 | Applied | Applied | A | A |
| Example 22 | S | 20 | 83 | 1 | 85 | Applied | Applied | A | A |
| Example 23 | T | 20 | 83 | 6 | 85 | Applied | Applied | A | A |
| Example 24 | U | -58 | 83 | 2 | 85 | Applied | Applied | C | B |
| Example 25 | V | 69 | 83 | 2 | 85 | Applied | Applied | B | A |
| Comparative Example 1 | M | 20 | — | | 85 | Not Applied | Not Applied | E | C |
| Comparative Example 2 | M | 20 | — | | 85 | Applied | Not Applied | E | C |
| Comparative Example 3 | M | 20 | — | | 85 | Applied | Applied | D | C |
| Comparative Example 4 | N | — | 83 | 2 | 85 | Applied | Applied | E | C |
| Comparative Example 5 | O | — | — | | 85 | Applied | Applied | E | C |
| Comparative Example 6 | P | 20 | 83 | 9 | 85 | Applied | Applied | D | C |
| Comparative Example 7 | W | 20 | 83 | 8 | 85 | Applied | Applied | D | C |

As shown in the above Table 1, in the Examples 1 to 25 the images have better texture in terms of hand feeling free from hardness, stickiness and like of the image and have improved rub fastness compared to Comparative Examples 1 to 7. In contrast, in the images formed in Comparative Examples 1 to 6, hardness or stickiness is felt on the image, which results in poor texture. Further, rub fastness is insufficient.

INDUSTRIAL APPLICABILITY

The present invention can be suitably applied to a non-woven fabric employing non-absorptive or low-absorptive fiber such as sanitary goods including diaper (including disposable pants), training pants and adult incontinence pants.

The above-mentioned "diaper" refers to absorptive property goods which are worn by babies and people with incontinence symptoms in such a manner that waist and legs of the wearer is rolled, and by which urine, excreted feces or the like can be received.

All publications, patent applications, and technical standards mentioned in this specification are herein incorporated by reference to the same extent as if each individual publication, patent application, or technical standard was specifically and individually indicated to be incorporated by reference.

What is claimed is:

1. An image forming method comprising:
applying a water-based ink comprising: polymer particles; wax particles having a ratio of from 0.5% by mass to less than 8% by mass with respect to a total amount of the ink; a colorant; and water, by inkjetting the ink onto a recording base material comprising an aggregate of a non-absorptive or low-absorptive fiber material,
wherein the non-absorptive fiber material comprises a fiber having a composition in which water absorption over 24 hrs is less than 0.2% by mass in accordance with ASTM test method ASTM D570, and the low-absorptive fiber material comprises a fiber having a composition in which water absorption over 24 hrs is from 0.2% by mass to less than 0.5% by mass in accordance with the ASTM test method ASTM D570,
wherein the polymer particles comprise polyurethane particles, and
wherein the polyurethane particles comprise polyurethane having a structure represented by the following Formula (PU-1):

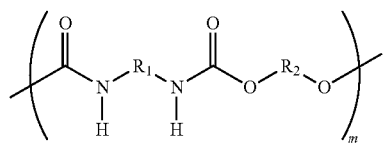

Formula (PU-1)

wherein, in Formula (PU-1), $R_1$ represents an aliphatic group or an aromatic group; $R_2$ represents a residue of a diol compound; and m represents an integer.

2. The image forming method according to claim 1, wherein the glass-transition temperature of the polymer particles is from is from −58° C. to 69° C., and a ratio of the polymer particles with respect to the total amount of the ink is from 1% by mass to 30% by mass.

3. The image forming method according to claim 2, wherein the melting point of the wax particles is from 50° C. to 150° C.

4. The image forming method according to claim 1, wherein the melting point of the wax particles is from 50° C. to 150° C.

5. The image forming method according to claim 1, wherein the water-based ink is applied onto the recording base material with an ink droplet amount of from 60 pl to 120 pl.

6. The image forming method according to claim 1, wherein a fiber diameter of a cross section orthogonal to a direction in which a fiber of the fiber material extends is from 1 μm to 200 μm.

7. The image forming method according to claim 1, wherein the fiber area density of the fiber material is from 1 $g/m^2$ to 300 $g/m^2$.

8. The image forming method according to claim 1, wherein, in Formula (PU-1), the residue of the diol compound represented by $R_2$ is selected from the group consisting of an alkylene group, a polyether group, a polyester group, a polycarbonate group and a polycaprolactone group.

9. The image forming method according to claim 1, wherein the polyurethane resin comprises an acidic group.

10. The image forming method according to claim 1, wherein the glass-transition temperature of the polyurethane particles is from 0° C. to 60° C.

11. The image forming method according to claim 1, wherein the polymer particles are selected from acrylic resin polymers, styrene-butadiene polymers, or polyolefin resin polymers.

12. The image forming method according to claim 1, wherein the content of the polymer particles is from 1% by mass to 30% by mass with respect to the total mass of the water-based ink.

13. The image forming method according to claim 1, wherein the wax particles comprise Carnauba wax, paraffin wax, or polyethylene wax.

14. The image forming method according to claim 1, wherein the pigment comprises a resin-coated pigment in which at least a portion of a surface of the pigment is covered with a cross-linked polymer in which a water-soluble resin has been cross-linked with a cross-linking agent.

15. The image forming method according to claim 1, wherein the non-absorptive or the low-absorptive fiber material comprises a polyolefin fiber, a polyester fiber, a synthetic fiber, a metal fiber or a glass fiber.

16. The image forming method according to claim 1, wherein the aggregate of the non-absorptive or low-absorptive fiber material comprises a nonwoven fabric, a textile or a glass wool.

17. The image forming method according to claim 1, further comprising, before the application of the water-based ink, subjecting the recording base material to a pretreatment comprising a hydrophilic treatment.

18. The image forming method according to claim 1, further comprising drying and fixing the water-based ink that has been applied onto the recording base material.

* * * * *